United States Patent [19]
Goto et al.

[11] Patent Number: 5,164,469
[45] Date of Patent: Nov. 17, 1992

[54] TRANSPARENT RESIN MATERIAL

[75] Inventors: Kohei Goto; Zen Komiya; Noboru Yamahara; Akira Iio; Masao Hisatomi; Hiroshi Oka, all of Yokkaichi, Japan

[73] Assignee: Japan Synthetic Rubber Co., Ltd., Tokyo, Japan

[21] Appl. No.: 648,237

[22] Filed: Jan. 31, 1991

Related U.S. Application Data

[63] Continuation-in-part of Ser. No. 613,939, Nov. 13, 1990, Pat. No. 5,053,471, which is a continuation of Ser. No. 270,631, Nov. 14, 1988, abandoned.

[30] Foreign Application Priority Data

| Nov. 17, 1987 | [JP] | Japan | 62-288527 |
| Nov. 17, 1987 | [JP] | Japan | 62-288528 |
| Jul. 13, 1990 | [JP] | Japan | 2-184271 |
| Jul. 20, 1990 | [JP] | Japan | 2-190764 |

[51] Int. Cl.$^5$ .................................... C08F 232/00
[52] U.S. Cl. ........................... 526/281; 526/169; 525/338; 525/326.1; 525/326.7; 525/327.4; 525/328.9; 525/329.5
[58] Field of Search ............... 526/281, 169; 525/338, 525/326.1, 326.7, 327.4, 328.9, 329.5

[56] References Cited

U.S. PATENT DOCUMENTS 4,068,063 1/1978 Ikeda et al. ................. 526/281

FOREIGN PATENT DOCUMENTS 60-026024 2/1985 Japan.

Primary Examiner—Joseph L. Schofer
Assistant Examiner—Alex H. Walker
Attorney, Agent, or Firm—Oblon, Spivak, McClelland, Maier & Neustadt

[57] ABSTRACT

A transparent resin material consisting of a hydrogenation product of a (co)polymer obtained by subjecting at least one compound represented by general formula (I) or a combination of at least 5% by weight of said compound and 95% by weight or less of other copolymerizable cyclic olefin monomer to metathesis polymerization:

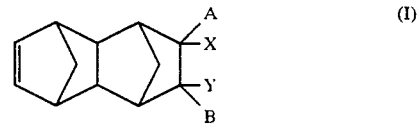

(I)

wherein A and B are independently hydrogen atoms or $C_{1-10}$ hydrocarbon groups; and X and Y are independently hydrogen atoms, $C_{1-10}$ hydrocarbon groups, $-C(CH_2)_n COOR^1$ groups or $-(CH_2)_n OCOR^1$ groups [$R^1$ is a $C_{1-20}$ hydrocarbon group and n is 0 or an integer of 1–10] with the proviso that at least one of X and Y is selected from the above $-(CH_2)_n COOR^1$ and $-(CH_2)_n OCOR^1$ groups. Said transparent resin material is moldable and has sufficient optical properties, low hygroscopicity, good heat resistance and excellent adhesion to recording layer.

18 Claims, No Drawings

TRANSPARENT RESIN MATERIAL

CROSS-REFERENCES TO RELATED APPLICATIONS

This is a continuation-in-part of U.S. patent application Ser. No. 07/613,939 filed Nov. 13, 1990, now U.S. Pat. No. 5,053,471 which is continuation of U.S. patent application Ser. No. 270,631 filed Nov. 14, 1988, now abandoned.

BACKGROUND OF THE INVENTION

This invention relates to a transparent resin material which enables the production of various transparent resin molded articles and which is preferably used in the production of video disk, compact disk, overwritable optical disk, storable, erasable and regeneratable optical disk, optical lens, etc.

In recent years, transparent resins have been used as a molding material for automobile parts, lighting appliances, electrical parts, sundry goods, etc. in which ordinary transparency is required. Further, the transparent resins have been applied as an optical material in which optical properties are important. Optical materials are required to have not only transparency but also other important properties which conventional transparent resins have been unable to satisfy.

As the material for optical disk substrate which is an example of optical materials, there are known a polycarbonate resin, a polymethyl methacrylate resin, a polycyclohexyl methacrylate resin, a copolymeric resin of an alkyl methacrylate and methyl methacrylate, styrene, or other monomer, a (co)polymer of a bulky ester group-containing methacrylic acid ester, a copolymer obtained by copolymerizing ethylene and a norbornene type hydrocarbon compound using a Ziegler-Natta catalyst [Japanese Patent Application Kokai (Laid-Open) No. 292,601/86], a (co)polymer which is a hydrogenation product of a (co)polymer obtained by subjecting a tetracyclododecene type hydrocarbon compound or a norbornene type hydrocarbon compound to ring opening (co)polymerization using a metathesis catalyst Japanese Patent Application Kokai (Laid-Open) No. 26,024/85] and a ring opening (co)polymer of a polar substituent-containing norbornene derivative [Japanese Patent Application Kokai (Laid-Open) Nos. 19,801/87 and 19,802/87].

The above transparent resin materials, however, do not satisfy all of the birefringenece, low hygroscopicity, mechanical strengths and adhesion to recording layer which are high requirements for a material for optical disk substrate.

For example, the polystyrene resin and the polycarbonate resin both having high birefringence give many errors during the regeneration of stored information by laser beam. The polymethyl methacrylate resin having high hygroscopicity is deformed owing to moisture absorption, to cause many errors during the regeneration of stored information and also is very likely to cause a property change of the recording film due to moisture absorption. The polycyclohexyl methacrylate resin has a low glass transition temperature, so it has low heat resistance. The copolymer of polycyclohexyl methacrylate and methyl methacrylate has high hygroscopicity. The copolymer of polycyclohexyl methacrylate and styrene has high birefringence and accordingly poor optical properties.

The (co)polymer of a norbornene type hydrocarbon obtained by polymerization using a Ziegler-Natta catalyst, a homopolymer of a tetracyclododecene type hydrocarbon compound obtained by metathesis ring opening polymerization or a hydrogenation product of the (co)polymer of norbornene type hydrocarbon has improved birefringence, hygroscopicity and heat resistance but has poor adhesion to recording layer because they have no polar group contributing to adhesion.

The optical material consisting of a ring opening (co)polymer of a polar substituent-containing norbornene derivative is improved in adhesion to recording layer because of the polar substituent but is unable to satisfy both high glass transition temperature and low water absorption because when a polar substituent giving a high transition temperature is selected the saturated water-absorption becomes high and when a polar substituent giving a low saturated water-absorption is selected the glass transition temperature becomes low. Further, this optical material has a problem that the durability for a long period is not sufficient because it contains unsaturated double bonds in the polymer structure.

Thus, substantially no satisfactory materials have existed as a transparent resin material which has sufficient optical properties, low hygroscopicity, good heat resistance and excellent adhesion to recording layer (i.e. durability).

SUMMARY OF THE INVENTION

The present inventors have made extensive research on a metathesis ring opening (co)polymer as a transparent resin material and have consequently found that a metathesis ring opening (co)polymerization of a polar substituent-containing tetracyclododecene derivative results in a (co)polymer satisfying the requirements that have not been satisfied by the metathesis ring opening (co)polymer of a norbornene derivative, especially that the optical material has both high glass transition temperature and low water absorption.

It is an object of this invention to provide a transparent resin material having excellent optical properties, low hygroscopicity and good heat resistance.

It is another object of this invention to provide an optical article obtained from the transparent resin material.

Other objects and advantages of this invention will become apparent from the following description.

According to this invention, there is provided a transparent resin material consisting of a hydrogenation product of a (co)polymer obtained by subjecting at least one compound represented by general formula (I) or a combination of at least 5% by weight of said compound with 95% by weight or less of other copolymerizable cyclic olefin monomer to metathesis polymerization:

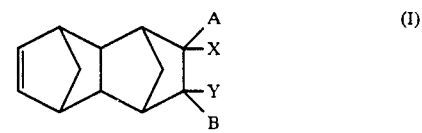

wherein A and B are independently hydrogen atoms or hydrocarbon groups of 1-10 carbon atoms, preferably 1-6 carbon atoms, more preferably 1-2 carbon atoms (it is particularly preferable that one of A and B is H and the other is CH$_3$); and X and Y are independently hydrogen atoms, $C_{1-10}$hydrocarbon groups, $-(CH_2)_nCOOR^1$, $-(CH_2)_nOCOR^1$ [$R^1$ is a $C_{1-20}$hydrocarbon group and n is 0 or an integer of 1-10] with the proviso that at least one of X and Y is selected from the above $-(CH_2)_nCOOR^1$ and $-(CH_2)_nOCOR^1$ groups.

This invention further provides an optical article obtained from the above transparent resin material.

DETAILED DESCRIPTION OF THE INVENTION

In general formula (I), the substituents A and B are preferably hydrocarbon groups for obtaining lower water absorption. However, when the hydrocarbon group has too many carbon atoms the heat resistance becomes inferior. Further, it is desirable to consider ease of monomer synthesis in the selection of the number of carbon atoms. Especially preferably, one of A and B is a methyl group and the other is a hydrogen atom in view of the balance of the ease of monomer synthesis and low water absorption.

The substituents X and Y are selected from the group consisting of a hydrogen atom, a $C_{1-10}$hydrocarbon group, $-(CH_2)_nCOOR^1$ and $-(CH_2)_nOCOR^1$ and at least one of X and Y is selected from $-(CH_2)_nCOOR^1$ and $-(CH_2)_nOCOR^1$. Preferably, one of X and Y is selected from a hydrogen atom and a $C_{1-10}$hydrocarbon group and the other is selected from $-(CH_2)_nCOOR^1$ and $-(CH_2)_nOCOR^1$. More preferably, one is a hydrogen atom and the other is $-COOR^{1'}$ or $-OCOR^{1'}$ ($R^{1'}$ is a $C_{1-4}$alkyl group or a $C_{5-20}$cyclic hydrocarbon group).

The substituents X and Y are preferably ester groups of $-(CH_2)_nCOOR^1$ in order to secure adhesion of resin surface without increasing water absorption excessively. More preferably, one of X and Y is a $C_{1-10}$hydrocarbon group or a hydrogen atom and the other is the ester group to further reduce water absorption. It is especially preferably that one of X and Y be a hydrogen atom from the viewpoint of ease of synthesis and the ester group has n being 0 for the purpose of enhancing the heat resistance. On the other hand, it is preferable that the $R^1$ group in the ester group be a hydrocarbon group having more carbon atoms for lowering the water absorption, while the $R^1$ group be a hydrocarbon group having less carbon atoms for enhancing the heat resistance. In order to balance the contradictory properties, it is preferable that the number of carbon atoms be 1 to 4.

The optimum compounds of general formula (I) are those where A=H, B=CH$_3$ or H, X=H and Y=-COOCH$_3$ or COOC$_2$H$_5$.

Specific examples of the tetracyclododecene derivative of general formula (I) include the followings:
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-isobutoxycarbonyltetracyclo[4.4.0.1$^{2,5}$.1$^{7,10}$]-3-dodecene,
8-sec-butoxycarbonyltetracyclo[4.4.0.1$^{2,5}$.1$^{7,10}$]-3-dodecene,
8-t-butoxycarbonyltetracyclo[4.4.0.1$^{2,5}$.1$^{7,10}$]-3-dodecene,
8-phenyloxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
8-methyl-8-sec-butoxycarbonyltetracyclo[4.4.0.1$^{2,5}$.1$^{7,10}$]-3-dodecene,
8-methyl-8-t-butoxycarbonyltetracyclo[4.4.0.1$^{2,5}$.1$^{7,10}$]-3-dodecene,
8-butoxycarbonyl-9-phenyltetracyclo[4.4.0.1$^{2,5}$.1$^{7,10}$]-3-dodecene,
8,9-dimethoxycarbonyltetracyclo[4.4.0.1$^{2,5}$.1$^{7,10}$]-3-dodecene,
8-cyclohexyloxycarbonyltetracyclo[4.4.0.1$^{2,5}$.1$^{7,10}$]-3-dodecene,
8-(4'-t-butylcyclohexyloxy)carbonyltetracyclo-[4.4.0.1$^{2,5}$.1$^{7,10}$]-3-dodecene,
8-methyl-8-cyclohexyloxycarbonyltetracyclo[4.4.0.1$^{2,5}$.1$^{7,10}$]-3-dodecene,
8-methyl-8-(4'-t-butylcyclohexyloxy)carbonyltetracyclo-[4.4.0.1$^{2,5}$.1$^{7,10}$]-3-dodecene,
8-methyloxycarbonyltetracyclo[4.4.0.1$^{2,5}$.1$^{7,10}$]-3-dodecene,
8-methyl-8-methyloxycarbonyltetracyclo[4.4.0.1$^{2,5}$.1$^{7,10}$]-3-dodecene,
8-bornyloxycarbonyltetracyclo[4.4.0.1$^{2,5}$.1$^{7,10}$]-3-dodecene,
8-methyl-8-bornyloxycarbonyl[4.4.0.1$^{2,5}$.1$^{7,10}$]-3-dodecene,
8-isobornyloxycarbonyl[4.4.0.1$^{2,5}$.1$^{7,10}$]-3-dodecene,
8-methyl-8-isobornyloxycarbonyl[4.4.0.1$^{2,5}$.1$^{7,10}$]-3-dodecene,
8-adamanthyloxycarbonyl[4.4.0.1$^{2,5}$.1$^{7,10}$]-3-dodecene,
8-methyl-8-adamanthyloxycarbonyl[4.4.0.1$^{2,5}$.1$^{7,10}$]-3-dodecene,
8-bicyclo[2.2.1]-2-heptyloxycarbonyl[4.4.0.1$^{2,5}$.1$^{7,10}$]-3-dodecene,
8-methyl-8-bicyclo[2.2.1]-2-heptyloxycarbonyl[4.4.0.1$^{2,5}$.1$^{7,10}$]-3-dodecene,
8-tetracyclo[4.4.0.1$^{2,5}$.1$^{7,10}$]-3-dodecyloxycarbonyl[4.4.0.1$^{2,5}$.1$^{7,10}$]-3-dodecene,
8-methyl-8-tetracyclo[4.4.0.1$^{2,5}$.1$^{7,10}$]-3-dodecyloxycarbonyl[4.4.0.1$^{2,5}$.1$^{7,10}$]-3-dodecene,
8-tricyclo[5.2.1.0$^{2,6}$]-8-decyloxycarbonyl[4.4.0.1$^{2,5}$.1$^{7,10}$]-3-dodecene,
8-methyl-8-tricyclo[5.2.1.0$^{2,6}$-8-decyloxycarbonyl[4.4.0.1$^{2,5}$.1$^{7,10}$]-3-dodecene,
8-pentacyclo[6.5.1.1$^{3,6}$.0$^{2,7}$.0$^{9,13}$]-4-pentadecyloxycarbonyl[4.4.0.1$^{2,5}$.1$^{7,10}$]-3-dodecene,
8-methyl-8-pentacyclo[6.5.1.1$^{3,6}$.0$^{2,7}$.0$^{9,13}$]-4-pentadecyloxycarbonyl[4.4.0.1$^{2,5}$.1$^{7,10}$]-3-dodecene,
8-tricyclo[6.2.1.0$^{2,7}$]-9-undecyloxycarbonyl[4.4.0.1$^{2,5}$.1$^{7,10}$]-3-dodecene,
8-methyl-8-tricyclo[6.2.1.0$^{2,7}$]-9-undecyloxycarbonyl[4.4.0.1$^{2,5}$.1$^{7,10}$]-3-dodecene,
8-pentacyclo[6.6.1.1$^{3,6}$.0$^{2,7}$.0$^{9,14}$]-4-hexadecyloxycarbonyl[4.4.0.1$^{2,5}$.1$^{7,10}$]-3-dodecene,
8-methyl-8-pentacyclo[6.6.1.1$^{3,6}$.0$^{2,7}$.0$^{9,14}$]-4-hexadecyloxycarbonyl[4.4.0.1$^{2,5}$.1$^{7,10}$]-3-dodecene, and 8-acetoxytetracyclo[4.4.0.1$^{2,5}$.1$^{7,10}$]-3-dodecene.

In the compound of general formula (I), the polar substituent is preferably a carboxylic acid ester group represented by —(CH$_2$)$_n$COOR$^1$ because the resulting polymer has a high glass transition temperature and low hygroscopicity.

The number of the carboxylic acid ester groups is preferably one per one molecule of the tetracyclododecene derivative because the resulting polymer has low hygroscopicity.

The smaller the n value in the formula —(CH$_2$)$_n$COOR$^1$ for the carboxylic acid ester group, the higher the glass transition temperature of the resulting polymer, and ordinarily n=0 is especially preferable because the monomer synthesis is easier, and the resulting polymer has good properties. In R$^1$, which is a C$_{1-20}$hydrocarbon group, a larger number of carbon atoms is preferred because the resulting polymer has lower hygroscopicity. In view of the balance of hygroscopicity and glass transition temperature of the polymer, a C$_{1-4}$acyclic hydrocarbon group or a C$_{5-20}$(poly)cyclic hydrocarbon group is preferred.

In the compound of general formula (I), it is preferable that the carbon atom to which the carboxylic acid ester group is bonded has a C$_{1-10}$hydrocarbon group as another substituent because the resulting polymer has low hygroscopicity without lowering the glass transition temperature.

In this invention, as a monomer to be subjected to ring-opening polymerization, namely a monomer of general formula (I), monomers synthesized from specific cyclopetadiene and/or dicyclopentadiene may be used. The purity of the dicyclopentadiene including cyclopentadiene is usually 96–98% by weight, and as impurities, 2–4% by weight of a co-dimer of cyclopentadiene and isoprene and 0.2–0.8% by weight of methyl dicyclopentadiene are contained in the dicyclopentadiene. The cyclopentadiene and the dicyclopentadiene have preferably a purity of 99% by weight or more, more preferably 99.5% by weight or more. When highly pure cyclopentadiene and/or highly pure dicyclopentadiene are used as the starting materials for the monomers for obtaining the ring-opening polymer, substantially complete hydrogenation can be conducted under conventional conditions. As a result, substantially completely hydrogenated ring-opening polymer of a monomer having a norbornene ring can be obtained. This hydrogenated polymer has very high heat resistance and weather resistance, and the reduction of the hydrogenation activity in the hydrogenation reaction is slight and the catalyst has a long life when it is used repeatedly. Therefore, the use of such a highly pure cyclopentadiene and/or dicyclopentadiene is very advantageous in industry.

The transparent resin of this invention is composed of a hydrogenation product of a (co)polymer of at least one compound represented by general formula (I) or a hydrogenation product of a copolymer of said compound and other copolymerizable cyclic olefin monomer. A good balance of heat resistance, moldability, water absorption, etc. can be obtained by copolymerizing said compound with other copolymerizable cyclic olefin monomer. In copolymerization, the proportion of the monomer of general formula (I) in the copolymer is at least 5 mole %, preferably at least 20 mole %. The copolymerizable cyclic olefin monomer used in the copolymerization is a monomer which is ring-opening-polymerizable in the presence of a metathesis catalyst.

The copolymerizable cyclic olefin monomer may be a polar cyclic olefin or a non-polar cyclic olefin.

Specific examples of the copolymerizable polar cyclic olefin monomer include polar substituent-containing bicyclo[2.2.1]-2-heptene derivatives represented by general formula (II):

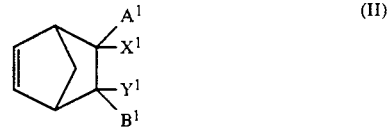

wherein A$^1$ and B$^1$ are independently hydrogen atoms or hydrocarbon groups of 1–10 carbon atoms, preferably 1–8 carbon atoms, more preferably 1–2 carbon atoms (it is preferable that one of A$^1$ and B$^1$ be H and the other be CH$_3$); X$^1$ and Y$^1$ are independently hydrogen atoms, C$_{1-10}$hydrocarbon groups, halogen atoms, halogen-substituted C$_{1-10}$hydrocarbon groups, —(CH$_2$)$_n$COOR$^1$, —(CH$_2$)$_n$OCOR$^1$, —(CH$_2$)$_n$OR$^1$, —(CH$_2$)$_n$CN, —(CH$_2$)$_n$CONR$^2$R$^3$, —(CH$_2$)$_n$COOZ, —(CH$_2$)$_n$OCOZ, —(CH$_2$)$_n$OZ or —(CH$_2$)$_n$W [R$^1$, R$^2$ and R$^3$ are independently C$_{1-20}$hydrocarbon groups, Z is a halogen-substituted hydrocarbon group, W is SiR$^5_p$D$_{3-p}$ (R$^5$ is a C$_{1-10}$hydrocarbon group, D is a halogen atom, —OCOR$^5$ or —OR$^5$, p is 0 or an integer of 1–3), n is 0 or an integer of 1–10] with the proviso that at least one of X$^1$ and Y$^1$ is selected from said groups other than the hydrogen atom and the hydrocarbon groups, or X$^1$ and Y$^1$ may form together

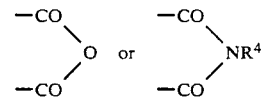

(R$^4$ is a C$_{1-20}$hydrocarbon group).

In general formula (II), the substituents A$^1$ and B$^1$ are preferably hydrocarbon groups in order to obtain lower water absorption. However, when the hydrocarbon group has too many carbon atoms, the heat resistance becomes inferior. Further, it is desirable to consider ease of monomer synthesis in the selection of the number of carbon atoms. Especially preferably, one of A$^1$ and B$^1$ is a methyl group and the other is a hydrogen atom in view of the balance of the ease of monomer synthesis and low water absorption.

The substituents X$^1$ and Y$^1$ are preferably selected from the group consisting of a hydrogen atom, a C$_{1-10}$hydrocarbon group, —(CH$_2$)$_n$COOR$^1$ and —(CH$_2$)$_n$OCOR$^1$. More preferably, one of X$^1$ and Y$^1$ is selected from a hydrogen atom and a C$_{1-10}$hydrocarbon group and the other is selected from —(CH$_2$)$_n$COOR$^1$ and —(CH$_2$)$_n$OCOR$^1$. Especially preferably, one is a hydrogen atom and the other is —COOR$^{1'}$ or —OCOR$^{1'}$ (R$^{1'}$ is a C$_{1-4}$alkyl group or a C$_{5-10}$cyclic hydrocarbon group) because the resulting polymer has low water absorption without impairing the heat resistance.

Specific examples of the bicyclo[2.2.1]-2-heptene represented by general formula (II) include the followings:
5-methoxycarbonylbicyclo[2.2.1]-2-heptene,
5-ethoxycarbonylbicyclo[2.2.1]-2-heptene,
5-n-propoxycarbonylbicyclo[2.2.1]-2-heptene,
5-isopropoxycarbonylbicyclo[2.2.1]-2-heptene,
5-n-butoxycarbonylbicyclo[2.2.1]-2-heptene, 5-isobutoxycarbonylbicyclo[2.2.1]-2-heptene,
5-sec-butoxycarbonylbicyclo[2.2.1]-2-heptene,
5-tert-butoxycarbonylbicyclo[2.2.1]-2-heptene,
5-phenyloxycarbonylbicyclo[2.2.1]-2-heptene,
5-methyl-5-methoxycarbonylbicyclo[2.2.1]-2-heptene,
5-butoxycarbonyl-6-phenylbicyclo[2.2.1]-2-heptene,
5,6-dimethoxycarbonylbicyclo[2.2.1]-2-heptene,
5-cyclohexyloxycarbonylbicyclo[2.2.1]-2-heptene,
5-(4'-tert-butylcylcohexyloxy)carbonylbicyclo[2.2.1]-2-heptene,
5-methyl-5-cyclohexyloxycarbonylbicyclo[2.2.1]-2-heptene,
5-methyl-5-(4'-tert-butylcyclohexyloxy)carbonylbicyclo[2.2.1]-2-heptene,
5-menthyloxycarbonylbicyclo[2.2.1]-2-heptene,
5-methyl-5-methyloxycarbonylbicyclo[2.2.1]-2-heptene,
5-bornyloxycarbonylbicyclo[2.2.1]-2-heptene,
5-methyl-5-bornyloxycarbonylbicyclo[2.2.1]-2-heptene,
5-isobornyloxycarbonylbicyclo[2.2.1]-2-heptene,
5-adamantyloxycarbonylbicyclo[2.2.1]-2-heptene,
5-methyl-5-adamantyloxycarbonylbicyclo[2.2.1]-2-heptene,
5-bicyclo[2.2.1]-2-heptyloxycarbonylbicyclo[2.2.1]-2-heptene, ·
5-methyl-5-bicyclo[2.2.1]-2-heptyloxycarbonylbicyclo[2.2.1]-2-heptene,
5-tetracyclo[4.4.0.1$^{2,5}$.1$^{7,10}$]-3-dodecyloxycarbonylbicyclo[2.2.1]-2-heptene,
5-methyl-5-tetracyclo[4.4.0.1$^{2,5}$.1$^{7,10}$]-3-dodecyloxycarbonylbicyclo[2.2.1]-2-heptene,
5-tricyclo[5.2.1.0$^{2,6}$]-8-decyloxycarbonylbicyclo[2.2.1]-2-heptene,
5-methyl-5-tricyclo[5.2.1.0$^{2,6}$]-decyloxycarbonylbicyclo[2.2.1]-2-heptene,
5-pentacyclo[6.5.1.1$^{3,6}$.0$^{2,7}$.0$^{9,13}$]-4-pentadecyloxycarbonylbicyclo[2.2.1]-2-heptene,
5-methyl-5-pentacyclo[6.5.1.1$^{3,6}$.0$^{2,7}$.0$^{9,13}$]-4-pentadecyloxycarbonylbicyclo[2.2.1]-2-heptene,
5-tricyclo[6.2.1.0$^{2,7}$]-9-undecyloxycarbonylbicyclo[2.2.1]-2-heptene,
5-methyl-5-tricyclo[6.2.1.0$^{2,7}$]-undecyloxycarbonylbicyclo[2.2.1]-2-heptene,
5-pentacyclo[6.6.1.1$^{3,6}$.0$^{2,7}$.0$^{9,14}$]-4-hexadecyloxycarbonylbicyclo[2.2.1]-2-heptene,
5-methyl-5-pentacyclo[6.6.1.1$^{3,6}$.0$^{2,7}$.0$^{9,14}$]-4-hexdecyloxycarbonylbicyclo[2.2.1]-2-heptene,
5-acetoxybicyclo[2.2.1]-2-heptene,
5-cyanobicyclo[2.2.1]-2-heptene,
6-methyl-5-cyanobicyclo[2.2.1]-2-heptene,
5-methyl-5-cycanobicyclo[2.2.1]-2-heptene,
5,6-dimethyl-5,6-dicycanobicyclo[2.2.1]-2-heptene,
5-carbamoylbicyclo[2.2.1]-2-heptene,
5-N-methylcarbamoylbicyclo[2.2.1]-2-heptene,
5-N,N-diethylcarbamoylbicyclo[2.2.1]-2-heptene,
N,N,N',N'-tetramethyl-5,6-dicarbamoylbicyclo-[2.2.1]-2-heptene,
5-chlorobicyclo[2.2.1]-2-heptene,
5-methyl-5-chlorobicyclo[2.2.1]-2-heptene,
5-chloromethyloxycarbonylbicyclo[2.2.1]-2-heptene,
5-dibromopropyloxycarbonylbicyclo[2.2.1]-2-heptene,
5-dichloropropyloxycarbonylbicyclo[2.2.1]-2-heptene,
5-chlorophenyloxycarbonylbicyclo[2.2.1]-2-heptene,
5-monobromophenyloxycarbonylbicyclo[2.2.1]-2-heptene,
5-tribromophenyloxycarbonylbicyclo[2.2.1]-2-heptene,
5,6-dichlorobicyclo[2.2.1]-2-heptene,
5-bromomethylbicyclo[2.2.1]-2-heptene,
5-bromoethylbicyclo[2.2.1]-2-heptene,
5-tribromobenzyloxycarbonylbicyclo[2.2.1]-2-heptene,
bicyclo[2.2.1]-2-heptene-5,6-dicarboxylic anhydride,
5,6-dimethylbicyclo[2.2.1]-2-heptene-5,6-dicarboxylic anhydride, bicyclo[2.2.1]-2-heptene-5,6-dicarboxylic acid imide,
N-phenyl-5-methylbicyclo[2.2.1]-2-heptenedicarboxylic acid imide,
5-trichlorosilylbicyclo[2.2.1]-2-heptene,
5-(dimethylmethoxysilyl)bicyclo[2.2.1]-2-heptene,
5-(dimethylacetylsilyl)bicyclo[2.2.1]-2-heptene, and
5-trimethylsilylbicyclo[2.2.1]-2-heptene.

The proportions of the compound represented by general formula (I) and the compound represented by general formula (II) in the copolymer can vary depending upon the glass transition temperatures and water absorptions of the respective homopolymers, but are preferably (I)/(II)=95/5-5/95 (by weight), more preferably (I)/(II)=90/10-10/90 (by weight).

The tetracyclododecene derivative of general formula (I) can be ring-opening-copolymerized with a non-polar cyclic olefin compound to form a copolymer. Specific examples of such a non-polar cyclic olefin include cycloolefins such as cyclopentene, cyclooctene, 1,5-cyclooctadiene, 1,5,9-cyclododecatriene and the like; and polycycloalkenes such as bicyclo[2.2.1]-2-heptene, tricyclo[5.2.1.0$^{2,6}$]-8-decene, tricyclo[5.2.1.0$^{2,6}$]-3-decene, tricyclo[6.2.1$^{1,8}$]-9-undecene, tricyclo[6.2.1.0$^{1,8}$]-4-undecene, tetracyclo[4.4.0.1$^{2,5}$.1$^{7,10}$]-3-dodecene, pentacyclo[6.5.1.1$^{3,6}$.0$^{2,7}$.0$^{9,13}$]-4-pentadecene, pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-11-pentadecene and the like.

The above polycycloalkenes are useful for obtaining a copolymer having low hygroscopicity and a controlled glass transition temperature. Hence, when the homopolymer of the tetradodecene derivative or a copolymer of the tetradodecene derivative with a bicycloheptene has a high glass transition temperature which is close to or above the thermal decomposition temperature, the tetracyclododecene derivative can be copolymerized with a cycloolefin to lower the glass transition temperature of the copolymer to a temperature at which molding can be easily effected actually.

When the obtained polymer has a glass transition temperature as low as not more than 100° C., it is possible to reduce the hygroscopicity and elevate the glass transition temperature by copolymerizing the tetracyclododecene derivative with a polycycloalkene.

The thus produced (co)polymer preferably has a saturated water absorption of 1.8% or less and a glass transition temperature of at least 100° C. The saturated water absorption is more preferably 1.2% or less, most preferably 0.8% or less. The glass transition temperature is more preferably at least 120° C.

The metathesis catalyst used in producing a ring opening (co)polymer ordinarily consists of a combination of:

(a) at least one member selected from the group consisting of compounds of w, Mo and Re, and
(b) at least one member selected from the group consisting of compounds of elements of the Ia, IIa, IIb, IIIa, IVa and IVb Groups of the Deming Periodic Table, having at least one element-to-carbon bond or at least one element-to-hydrogen bond.

The metathesis catalyst may further contain an additive for enhancing the catalyst activity.

W, Mo and Re compounds suitable as the (a) component are halides, oxyhalides, alkoxyhalides, alkoxides, carboxylates, (oxy)acetylacetonates, carbonyl complexes, acetonitrile complexes and hydride complexes of W, Mo and Re, their derivatives, and their combinations. Of these, preferred are compounds of W and Mo, and particularly preferred are halides, oxyhalides and alkoxyhalides of W and Mo from the standpoint of their polymerization activity and practical use. Each of the W, Mo and Re compounds may be a mixture of two or more compounds which can form the above W, Mo or Re compound upon reaction with each other. Also, the W, Mo or Re compound may be complexed with an appropriate complexing agent such as $P(C_6H_5)_5$, $C_5H_5N$ or the like.

Specific examples of the (a) component are $WCl_6$, $WCl_5$, $WCl_4$, $WBr_6$, $WF_6$, $WI_6$, $MoCl_5$, $MoCl_4$, $MoCl_3$, $ReCl_3$, $WOCl_4$, $MoOCl_3$, $ReOCl_3$, $ReOBr_3$, $W(OC_6H_5)_6$, $WCl_2(OC_6H_5)_4$, $Mo(OC_2H_5)_2Cl_3$, $Mo(OC_2H_5)_5$, $MoO_2(acac)_2$, $W(OC_2H_5)_2Cl_3$, $W(OCOR)_5$, $W(CO)_6$, $Mo(CO)_6$, $Re_2(CO)_{10}$, $ReOBr_3 \cdot P(C_6H_5)_3$, $WCl_5 \cdot P(C_6H_5)_3$, $WCl_6 \cdot C_5H_5N$, $W(CO)_5 \cdot P(C_6H_5)_3$, $W(CO)_3 \cdot (CH_3CN)_3$. Of these, $MoCl_5$, $Mo(OC_2H_5)_2C_3$, $WCl_6$ and $W(OC_2H_5)_2Cl_3$ are especially preferred.

Compounds suitable as the (b) component are compounds of elements of the Ia, IIa, IIb, IIIa, IVa and IVb Groups of the Deming Periodic Table, having at least one element-to-carbon bond or at least one element-to-hydrogen bond, or hydrides of the elements. Specific examples of the (b) component include $n-C_4H_5Li$, $n-C_5H_{11}Na$, $C_5H_5Na$, $CH_3MgI$, $C_3H_5MgBr$, $CH_3MgBr$, $n-C_3H_7MgCl$, $(C_6H_5)_3Al$, $t-C_4H_9MgCl$, $CH_2=CHCH_2MgCl$, $(C_2H_5)_2Zn$, $(C_2H_5)_2Cd$, $CaZn(C_2H_5)_4$, $(CH_3)_3B$, $(C_2H_5)_3B$, $(n-C_4H_9)_3B$, $(CH_3)_3Al$, $(CH_3)_2AlCl$, $(CH_3)_3Al_2Cl_3$, $CH_3AlCl_2$, $(C_2H_5)_3Al$, $LiAl(C_2H_5)_2$, $(C_2H_5)_3Al-O(C_2H_5)_2$, $(C_2H_5)_2AlCl$, $C_2H_5AlCl_2$, $(C_2H_5)_2AlH$, $(iso-C_4H_9)_2AlH$, $(C_2H_5)_2AlOC_2H_5$, $(C_3H_7)_3Al$, $(iso-C_4H_9)_3Al$, $(C_2H_5)_3Al_2Cl_3$, $(CH_3)_4Ga$, $(CH_3)_4Sn$, $(n-C_4H_9)_4Sn$, $(C_2H_5)_3SiH$, $(n-C_6H_{13})_3Al$, $(n-C_8H_{17})_3Al$, $LiH$, $NaH$, $B_2H_6$, $NaBH_4$, $AlH_3$, $LiAlH_4$, and $TiH_4$. A mixture of two or more compounds which can form one of the above compounds upon reaction with each other may be used as an alternative.

Particularly preferred are $(CH_3)_3Al$, $(CH_3)_2AlCl$, $(CH_3)_3Al_2Cl_3$, $CH_3AlCl_2$, $(C_2H_5)_3Al$, $(C_2H_5)_2AlCl$, $(C_2H_5)_{1.5}AlCl_{1.5}$, $C_2H_5AlC_2$, $(C_2H_5)_2AlH$, $(C_2H_5)_2AlOC_2H_5$, $(C_2H_5)_2AlCN$, $(C_3H_7)_3Al$, $(iso-C_4H_9)_3Al$, $(iso-C_4H_9)_2AlH$, $(n-C_6H_{13})_3Al$, $(n-C_8H_{17})_3Al$ and $(C_6H_5)_3Al$.

The proportions of the (a) component and the (b) component are (a):(b)=1:1–1:20, preferably (a):(b)=1:2–1:10 in terms of metallic atom ratio.

The catalyst prepared from the (a) and (b) components ordinarily exhibits a high activity in the polymerization reaction for obtaining a transparent resin. If necessary, the catalyst can further contain a component (c) (an activating agent) as mentioned below to obtain a higher activity.

Various compounds can be used as the (c) component. Especially preferable compounds include the followings:
(1) simple boron; non-organometal compounds of boron such as $BF_3$, $BCl_3$, $B(O-n-C_4H_9)_3$, $(C_2H_5O)_2BF$, $B_2O_3$, $H_3BO_3$ and the like; and non-organometal compounds of Si such as $Si(OC_2H_5)_4$ and the like,
(2) alcohols, hydroperoxides and peroxides,
(3) water,
(4) oxygen,
(5) carbonyl compounds such as aldehyde, ketone and the like; and their polymers,
(6) cyclic ethers such as ethylene oxide, epichlorohydrin, oxetane and the like,
(7) amides such as N,N-diethylformamide, N,N-dimethylacetamide and the like; amines such as aniline, morpholine, piperidine and the like; and azo compounds such as azobenzene and the like,
(8) N-nitroso compounds such as n-nitrosodimethylamine, N-nitrosodiphenylamine and the like; and
(9) compounds containing a S-Cl or N-Cl group such as trichloromelamine, N-chlorosuccinoimide, phenylsulphenyl chloride and the like.

When the (c) component is used, the proportions of the (a) and (b) components greatly vary depending upon the type of the (c) component and cannot be determined by a specific rule. The (c) component is used in many cases at a (c)/(a) molar ratio of 0.005-10, preferably 0.05-1.0.

The molecular weight of the ring opening (co)polymer obtained can be controlled by changing reaction conditions such as type and concentration of catalyst, polymerization temperature, type and concentration of solvent and concentration of monomer. Preferably, the molecular weight is controlled by adding to the reaction system an appropriate amount of a compound having at least one carbon-to-carbon double bond or at least one carbon-to-carbon triple bond within the molecule, such as α-olefin, α,ω-diolefin, acetylene or the like, or an appropriate amount of a polar allyl compound such as allyl chloride, allyl acetate, trimethylallyloxysilane or the like.

The molecular weight of the ring opening (co)polymer is preferably 10,000–3,000,000 in terms of polystyrene-reduced weight-average molecular weight. It is more preferably 30,000–1,000,000 for obtaining a high glass transition temperature and good moldability and especially preferably 50,000–900,000 for obtaining a proper balance of moldability and strength.

The solvent used in the polymerization reaction includes, for example, alkanes such as pentane, hexane, heptane, octane, nonane, decane and the like, cycloalkanes such as cyclohexane, cycloheptane, cyclooctane, decalin, norbornane and the like; aromatic compounds such as benzene, toluene, xylene, ethylbenzene, cumene and the like; halogenated alkanes and halogenated aryl compounds such as methylene chloride, bromohexane, dichloroethane, hexamethylene dibromide, chlorobenzene and the like; saturated carboxylic acid esters such as ethyl acetate, methyl propionate and the like; and ethers.

The hydrogenation reaction of the (co)polymer obtained by the metathesis ring opening polymerization can be effected according to a conventional method. The catalyst used in this hydrogenation reaction may be a catalyst which is used in the conventional hydrogenation reaction of olefinic compound.

The heterogeneous catalyst includes, for example, solid catalysts in which a catalyst substance such as palladium, platinum, nickel, rhodium, ruthenium or the like is supported on a carrier such as carbon, silica, alumina, titania or the like.

The homogeneous catalyst includes, for example, nickel naphthenate/triethylaluminum; nickel acetylacetonate/ triethylaluminum; cobalt octenoate/n-butyllithium; titanocene dichloride/diethylaluminum monochloride; and rhodium catalysts such as rhodium acetate, chlorotris(triphenylphosphine)rhodium and the like.

In the case of a heterogeneous system hydrogenation catalyst, it is preferable to use a catalyst supported on a carrier consisting of silica and an oxide of an element of the IIA Group of the Periodic Table in order for the catalyst to have a high activity and a long life.

The oxide of an element of the IIA Group of the Periodic Table includes beryllium oxide, magnesium oxide, calcium oxide, strontium oxide and barium oxide. Silica and the oxide may be in the form of a mere mixture if they are intimately mixed; however, it is better that they be in the form of a complex. Among the carriers, silica-magnesia is optimum in view of hydrogenation activity and catalyst life.

In the complex carrier, the proportion of silica to the oxide is such that the atomic ratio of Si/the IIA Group element is in a range of 10:90–90:10, preferably 20:80–85:15, more preferably 70:30–80:20.

The carrier consisting of silica and an oxide of an element of the IIA Group of the Periodic Table used in this invention has preferably a specific surface area of 10–1,000 m²/g, more preferably 20–800 m²/g and most preferably 50–600 m²/g. The pore volume thereof is preferably 0.05–10 ml/g, more preferably 0.2–5 ml/g, most preferably 0.4–3 ml/g. The average pore diameter thereof is preferably 1–1,000 nm, more preferably 5–500 nm, most preferably 10–200 nm.

The metal component having a hydrogenation activity supported on the above carrier may be any metal as far as it has a hydrogenation activity and is not critical. However, in order to increase the hydrogenation activity, the metal component is preferably at least one metal selected from the group consisting of palladium, rhodium, platinum, ruthenium and rhenium. Among these metals, palladium is optimum in view of catalyst activity and metal cost.

The hydrogenation reaction can be effected at 0°–180° C., preferably 20°–150° C. in a hydrogen gas atmosphere at atmospheric pressure-300 atm., preferably 3–150 atm.

The hydrogenated (co)polymer has excellent heat stability and accordingly its characteristics are not deteriorated even when it is heated during molding or during use as a product.

The hydrogenation degree is ordinarily at least 90%, preferably at least 95%, more preferably at least 98%, especially preferably at least 99%. When the hydrogenation degree is less than 90%, the effect of heat stability improvement is low.

In the step of hydrogenation of the (co)polymer obtained by subjecting at least one monomer represented by general formula (I) or this monomer and other copolymerizable cyclic olefin monomer to ring opening polymerization, it is preferable to effect the hydrogenation in substantially the same organic solvent as used in the ring opening polymerization step.

As such an organic solvent, there is used at least one compound selected from saturated carboxylic acid esters, saturated alicyclic hydrocarbon compounds and ether compounds. The solvent is preferably at least one compound selected from the alkyl esters of saturated carboxylic acids wherein the sum total of the carbon atoms of the alkyl group due to the saturated carboxylic acid and those of the alkyl group due to the alcohol are 5–10, $C_{5-10}$ saturated alicyclic hydrocarbon compounds, $C_{4-10}$ acyclic monoether compounds, $C_{4-10}$ acyclic diether compounds and $C_{4-10}$ compounds having an ether bond and a carboxylic acid ester group in the molecule.

The saturated carboxylic acid esters used as an organic solvent in this invention are represented by the general formula, $R^a$—$COOR^b$ where $R^a$ is a hydrogen atom or a $C_{1-2}$ alkyl group and $R^b$ is an alkyl group having 1–10 carbon atoms, preferably 1–6 carbon atoms, more preferably 1–4 carbon atoms.

Specific examples of the saturated carboxylic acid esters include, for example, formic acid esters such as methyl formate, ethyl formate, n-propyl formate, isopropyl formate, n-butyl formate, 1-methylpropyl formate, 2-methylpropyl formate, tert-butyl formate, n-pentyl formate, 1-methylbutyl formate, 2-methylbutyl formate, 3-methylbutyl formate, 1,1-dimethylpropyl formate, 1,2-dimethylpropyl formate, 2,2-dimethylpropyl formate, n-hexyl formate, 1-methylpentyl formate, 2-methylpentyl formate, 3-methylpentyl formate, 4-methylpentyl formate, 1,1-dimethylbutyl formate, 2,2-dimethylbutyl formate, 3,3-dimethylbutyl formate, 1,2-dimethylbutyl formate, 1,3-dimethylbutyl formate, 2,3-dimethylbutyl formate, n-heptyl formate, cyclohexyl formate, n-octyl formate, 2-ethylhexyl formate and the like; acetic acid esters such as methyl acetate, ethyl acetate, n-propyl acetate, isopropyl acetate, n-butyl acetate, 1-methylpropyl acetate, 2-methylpropyl acetate, tert-butyl acetate, n-pentyl acetate, 1-methylbutyl acetate, 2-methylbutyl acetate, 3-methylbutyl acetate, 1,1-dimethylpropyl acetate, 1,2-dimethylpropyl acetate, 2,2-dimethylpropyl acetate, n-hexyl acetate, 1-methylpentyl acetate, 2-methylpentyl acetate, 3-methylpentyl acetate, 4-methylpentyl acetate, 1,1-dimethylbutyl acetate, 2,2-dimethylbutyl acetate, 3,3-dimethylbutyl acetate, 1,2-dimethylbutyl acetate, 1,3-dimethylbutyl acetate, 2,3-dimethylbutyl acetate, cyclohexyl acetate, n-heptyl acetate, n-octyl acetate, 2-ethylhexyl acetate and the like; and propionic acid esters such as ethyl propionate, methyl propionate, n-propyl propionate, isopropyl propionate, n-butyl propionate, 1-methylpropyl propionate, 2-methylpropyl propionate, tert-butyl propionate, n-pentyl propionate, 1-methylbutyl propionate, 2-methylbutyl propionate, 3-methylbutyl propionate, 1,1-dimethylpropyl propionate, 1,2-dimethylpropyl propionate, 2,2-dimethylpropyl propionate, n-hexyl proprionate, cyclohexyl propionate, n-heptyl propionate, n-octyl propionate, 2-ethylhexyl propionate and the like.

The saturated alicyclic hydrocarbon compounds used as an organic solvent in this invention have a cyclic skeletal structure of 10 or less carbon atoms, preferably 5–8 carbon atoms and may be substituted with an alkyl group. Specific examples of the saturated alicyclic hydrocarbon compounds include, for example, cyclopentane, methylcyclopentane, cyclohexane, methylcyclohexane, dimethylcyclohexane, ethylcyclohexane, cycloheptane, decalin and the like.

The ether compounds are preferably $C_{4-10}$ acyclic monoether compounds and acyclic diether compounds. Specific examples of the ether compounds include di-n-propyl ether, di-isopropyl ether, di-n-butyl ether, di-isobutyl ether, di-tert-butyl ether, dipentyl ether, 1,2-dimethoxyethane, 1,2-diethoxyethane, 1,2-methoxyethoxyethane, 1,2-dipropoxyethane, 1,2-dibutoxyethane, 2-methoxyethyl acetate, 2-ethoxyethyl acetate, 2-propoxyethyl acetate, 2-butoxyethyl acetate, 3-methoxypropyl acetate and 3-ethoxypropyl acetate.

Of these, preferred are n-butyl acetate, cyclohexane, dibutyl ether, 1,2-dimethoxyethane, 1,2-diethoxyethane, methoxyethyl acetate and ethoxyethyl acetate, and n- butyl acetate is the most preferable, from the standpoints of solvency over a wide temperature range and ease of recovery.

The above saturated carboxylic acid esters, saturated alicyclic hydrocarbon compounds and ether compounds do not deteriorate the activities of the metathesis polymerization catalyst and hydrogenation catalyst used and moreover have a high solvency for both the ring opening (co)polymer produced by a metathesis ring opening reaction and the hydrogenated product of the (co)polymer. Therefore, the molecular weight control of the desired hydrogenated (co)polymer is easy; a hydrogenated (co)polymer can be produced in a high yield; and the hydrogenation reaction can give a high hydrogenation degree. Further, since said solvents themselves do not undergo hydrogenation, reduction with hydrogen and hydrocracking, there is no unnecessary consumption of hydrogen and the solvents can be used repeatedly, which is economically advantageous.

In the production of the hydrogenation product of this invention, one common specific organic solvent is used in both the ring opening (co)polymerization step and the hydrogenation step. Therefore, these two steps can be effected continuously without separating the ring opening (co)polymer after the ring opening polymerization reaction. Further, in the present invention, the molecular weight control of the polymer produced is easy and both the catalyst and the organic solvent can be reused. Accordingly, a desired hydrogenated (co)polymer can be produced very easily at a high efficiency.

Catalyst removal is effected preferably by contacting the hydrogenated (co)polymer solution with an aqueous solution of an organic acid. This catalyst-removal method enables the efficient removal of not only the metals of a ring opening polymerization catalyst consisting of a main catalyst represented by a tungsten compound and an organometal compound having a reducing power, a representative of which is an organoaluminum compound, but also the halogen atoms bonded to said metal atoms, and can produce a hydrogenated (co)polymer containing very small amounts of residual metals and halogens (these residual metals and halogens cause the deterioration and coloring of a hydrogenated (co)polymer containing them).

The organic acid compound includes, for example, aliphatic monocarboxylic acids such as formic acid, acetic acid, monochloroacetic acid, dichloroacetic acid, trichloroacetic acid, propionic acid, acrylic acid, itaconic acid and the like; aliphatic dicarboxylic acids such as oxalic acid, malonic acid, adipic acid, azelaic acid, maleic acid, fumaric acid and the like; aliphatic polycarboxylic acids such as propanetricarboxylic acid, butanetetracarboxylic acid and the like; oxy acids such as citric acid, tartaric acid and the like; alicyclic mono-, di- and polycarboxylic acids such as cyclopentanecarboxylic acid, cyclopentanedicarboxylic acid, cyclopentanetricarboxylic acid, cyclopentanetetracarboxylic acid, cyclohexanecarboxylic acid, cyclohexanedicarboxylic acid, cyclohexanetricarboxylic acid, cyclohexanetetracarboxylic acid, himic acid and the like; aromatic mono-, di- and poly-carboxylic acids such as benzoic acid, phthalic acid, isophthalic acid, terephthalic acid, trimellitic acid, pyromellitic acid and the like; and phenols such as phenol, cresol, xylenol and the like. Of these, organic acids having 1 to 6 carbon atoms are preferred because they are less soluble in the formed polymer and hence hardly remain therein. Among these organic acids, acetic acid and oxalic acid are especially preferred because they are excellent in removal efficiency of catalyst metals and also removal efficiency of halogens which are a constructive element for catalyst (chlorine in particular) and do not remain in the polymer after the decatalyst treatment and can be separated from the polymer.

The organic acid compound is usually used in the form of a 0.05–15% by weight aqueous solution, preferably a 0.1–10% by weight aqueous solution, especially preferably a 0.5–8% by weight aqueous solution.

When the concentration of the organic acid compound in the aqueous solution is less than 0.05%, the removal efficiency of the residual catalyst metals and halogens is low and the recovered polymer contains large amounts of them which cause coloration of the polymer. When the concentration of the organic acid compound is more than 15%, the effect of the organic acid compound is already at a saturation point, and even the polymer recovered after the neutralization of the organic acid compound to remove the same contains a certain amount of the organic acid compound. This organic acid compound causes the coloring of the polymer under the high temperature conditions used during the molding of the polymer, and the organic acid bleeds to the surface of the resulting molded article to impair the appearance of the article. When the organic acid concentration is in a range of 0.05–15%, it has a stable residual catalyst removal effect, and the resulting polymer is hardly colored owing to residual catalyst metal and contains substantially no organic acid.

In general, the proportion between the hydrogenated ring opening (co)polymer solution and the aqueous organic acid solution is preferably 5–500 parts by weight, more preferably 10–300 parts by weight, especially preferably 20–200 parts by weight of the aqueous organic acid solution, per 100 parts by weight of the hydrogenated (co)polymer solution having a polymer concentration of 1–30% by weight.

The method of contacting the hydrogenated (co)polymer solution with the aqueous organic acid solution can usually be carried out using a conventional mechanical stirrer, a static mixer, a line mixer, a homomixer, etc. Needless to say, the use of a stirrer having a higher stirring efficiency is superior in efficiency of removal of the residual metals in the hydrogenated (co)polymer solution. The contact time and temperature may be varied depending upon the efficiency of stirring, and the contact time is ordinarily 1 minute to 3 hours. The lower limit of the contact temperature is the freezing point of water and the upper limit is the boiling point of the solvent of the hydrogenated (co)polymer solution or the boiling point of water (lower point of the two). The preferable contact temperature range is 5°–60° C.

After the hydrogenated (co)polymer solution has been contacted with the aqueous organic acid solution to remove, by extraction, the catalyst metals from the hydrogenated (co)polymer solution, the organic layer is, if necessary, neutralized, washed with water and subjected to a conventional polymer recovery step to isolate a hydrogenated (co)polymer freed of the polymerization catalyst.

In recovering a hydrogenation product of a ring opening (co)polymer of at least one monomer represented by general formula (I) or a ring opening copolymer of said monomer and other copolymerizable cyclic olefin monomer from its solution, it is preferable that a solution of the hydrogenation product to be recovered be mixed with a mixed solvent consisting of 5-50 parts by volume of a good solvent (good to the hydrogenated (co)polymer) and 95-50 parts by volume of a poor solvent (the two solvents must be miscible with each other) so that the volume ratio of the hydrogenation product solution to the mixed solvent becomes 1:90-30:70, whereby the hydrogenation product be coagulated and then recovered.

The hydrogenation product solution to which the above-mentioned recovery process is applied is a solution containing a hydrogenation product of a (co)polymer produced from the above-mentioned cyclic monomer of general formula (I). Specific examples of the hydrogenation product solution include (1) a hydrogenated (co)polymer solution obtained by subjecting to hydrogenation reaction the (co)polymer solution obtained after completion of the ring-opening (co)polymerization reaction of said monomer, (2) a solution obtained by subjecting the hydrogenated (co)polymer solution (1) to a decatalyst treatment and (3) a hydrogenated (co)polymer solution obtained by dissolving in an appropriate solvent a hydrogenated (co)polymer recovered by, for example, subjecting the solution (2) to ordinary recovery method such as steam stripping or coagulation from poor solvent.

In the recovery process in this invention, it is preferable that a hydrogenated product solution as mentioned above and a mixed solvent consisting of specific proportions of a good solvent for the objective hydrogenated (co)polymer and a poor solvent for the objective hydrogenated (co)polymer be mixed at a specific ratio, whereby the objective hydrogenated (co)polymer is coagulated, separated and recovered.

In this invention, the good solvent for the objective hydrogenated (co)polymer refers to such a solvent that the maximum solubility of the hydrogenated (co)polymer in the solvent at a temperature as employed in the recovery treatment is at least 5% by weight, and the poor solvent refers to such a solvent that the maximum solubility of the hydrogenated (co)polymer in the solvent at the same temperature is less than 5% by weight.

In the above-mentioned recovery process, the good solvent includes, for example, aromatic hydrocarbon compounds such as benzene, toluene, xylene, ethylbenzene, cumene, butylbenzene, tetralin, p-cymene, cyclohexylbenzene, diethylbenzene and the like; alicyclic hydrocarbon compounds such as cyclopentane, methylcyclopentane, cyclohexane, methylcyclohexane and the like; halogenated hydrocarbon compounds such as methylene chloride, chloroform, carbon tetrachloride, 1,1-dichloroethane, 1,2-dichloroethane, 1,1,1-trichloroethane, 1,1,2-trichloroethane, 1,1,2,2-tetrachloethane, 1,1,2,2-tetrachloroethane, pentachloroethane, hexachloroethane, 1,2-dichloropropane, 1,2,3-trichloropropane, bromoform, 1,2-bromoethane, 1,1,2,2-tetrabromoethane, chlorobenzene, dichlorobenzene, bromobenzene, dibromobenzene and the like; esters of aliphatic carboxylic acids of 2 or more carbon atoms with alcohols of 3 or more carbon atoms such as butyl acetate, propyl acetate, pentyl acetate, hexyl acetate, cyclohexyl acetate, methyl propionate, ethyl propionate, butyl propionate, pentyl propionate, hexyl propionate and the like; cyclic ether compounds such as tetrahydrofuran, dioxane, tetrahydropyran, cineole and the like; and their mixtures. Of these, the aromatic hydrocarbon compounds, the cyclic ether compounds and the carboxylic acid esters are preferably used as the good solvent.

The poor solvent includes, for example, aliphatic hydrocarbon compounds such as hexane, butane, octane, nonane, decane, undecane, dodecane and the like; esters of a lower carboxylic acid of 3 or less carbon atoms with an alcohol of 2 or less carbon atoms, such as methyl formate, ethyl formate, methyl acetate, ethyl acetate and the like; lower alkyl ketones such as acetone, methyl ethyl ketone and the like; lower alcohols such as methanol, ethanol, propanol, butanol, pentanol, hexanol and the like; and their mixtures. Of these, the lower alkyl ketones and the lower alcohols are preferably used as the poor solvent.

With respect to the mixed solvent used in this invention, specific examples of a preferable combination of a good solvent and a poor solvent are combinations of a good solvent selected from aromatic hydrocarbon compounds (e.g. toluene, xylene and the like), cyclic ether compounds (e.g. tetrahydrofuran, dioxane and the like) and carboxylic acid esters (e.g. n-butyl acetate, isobutyl acetate and the like) with a poor solvent selected from the lower alcohols, for example, methanol, ethanol, propanol and the like.

Of these combinations, especially preferable are combinations of toluene, xylene, tetrahydrofuran or n-butyl acetate as a good solvent with methanol as a poor solvent because such mixed solvents enable the recovery of a hydrogenated (co)polymer containing small amounts of low-molecular weight polymers (the low-molecular weight polymers refer to polymers having a polystyrene-reduced molecular weight of, for example, 3000 or less) and are easy to recover, thus providing an economical advantage. In this invention, the solvent used in the hydrogenated (co)polymer solution can be the same as the good solvent. This matter is preferable because the solvent recovery and refining step can be simple.

The volume ratio of the good solvent to the poor solvent is preferably 5:95-50:50, especially preferably 20:80-40:60. When the two solvents are in these ranges, hydrogenated (co)polymer recovery is easy and the recovery (%) is high. The recovered hydrogenated (co)polymer contains small amounts of the unreacted monomer(s) and low-molecular weight polymers.

In the recovery process in this invention, the volume ratio of the hydrogenated (co)polymer solution to the mixed solvent is preferably 1:99-30:70, especially preferably 5:95-15:85.

By mixing the hydrogenated (co)polymer solution with the mixed solvent, the hydrogenated (co)polymer is coagulated. This hydrogenated (co)polymer is separated from the liquid phase and recovered according to a conventional means such as filtration, centrifugation or the like. At the time of this separation, the hydrogenated (co)polymer may be ground by use of an apparatus such as a crusher or the like.

The thus recovered hydrogenated (co)polymer can be subjected to post-treatment if necessary. For example, by contacting the hydrogenated (co)polymer with a poor solvent, the unreacted monomers and low-molecular weight polymers or their hydrogenation products remaining in the hydrogenated (co)polymer can be extracted and removed. As such a poor solvent, the poor solvents mentioned as one component of the mixed solvent can be used though lower alcohols are preferable and methyl alcohol is the most preferable mainly because it causes no caogualtion of the hydrogenated (co)polymer during the extraction step. The contact with the poor solvent is effected at a temperature ranging from room temperature to 150° C., preferably from room temperature to 120° C., for a period of ordinarily 5 minutes to 50 hours, preferably 20 minutes to 30 hours, more preferably 30 minutes to 15 hours.

In carrying out the production of the hydrogenated product of this invention, it is possible to add to the mixed system of the mixed solvent and the (co)polymer solution, additives such as catalyst-removing agent, antioxidant, ultraviolet absorber and the like to obtain a hydrogenated (co)polymer having effects of such additives.

The hydrogenated norbornene type (co)polymer used in this invention has preferably a gel content of not more than 1% by weight. When the gel content is not more than 1% by weight, the molded article obtained by injection molding can be prevented from having silver streaks and fish eyes on its surface. The gel content means that determined by the following methods: In chloroform is dissolved 50 g of the hydrogenated polymer at a temperature of 25° C. to form a hydrogenated polymer solution in chloroform having a polymer concentration of 1%, and this solution is filtered through a membrane filter having a pore diameter of 0.5 $\mu$m (manufactured by Advantech Toyo K. K.) which filter has previously been weighed. The filter after the filtration is dried and weighed. The gel content is calculated from the increased weight.) The lower the gel content, the lower the formation of bad molded article can be inhibited by controlling the conditions for the injection molding. In particular, when the gel content is not more than 0.1% by weight, it is possible to conduct the injection molding under severe conditions such as high molding temperature, high molding speed and the like. When a more precision optical article is intended to be produced, the gel content is preferably 0.01% by weight or less, more preferably 0.001% by weight or less. On the other hand, in the case of an extrusion molding for producing a transparent film as a molded article, the upper limit of gel content which causes bad appearance due to fish eyes is more severer than in the case of injection molding, and must be less than 0.1% by weight even under usual molding conditions.

In order to produce a hydrogenated polymer having such a low gel content, the following methods can be used, for example:

(i) A method in which the finishing (solvent-removal) step is always conducted in an inert atmosphere.

The above finishing step, particularly the solvent-removal step, is conducted with heating, so that it is desirable to conduct operations in a nitrogen atmosphere in order to prevent gelation. Specifically, the handling of a hydrogenated polymer solution before the finishing step is always conducted in a nitrogen atmosphere.

(ii) A method in which an appropriate antioxidant is added, for example, after the step of hydrogenation of the polymer.

(iii) A method in which the finishing (solvent-removal) is effected at a temperature as low as possible.

The following (a) to (c) methods can be used for this purpose:

(a) A solvent having a boiling point as low as possible is used.

However, when the boiling point of the solvent used is too low, the inner pressure becomes high at the time of polymerization of hydrogenation, so that it becomes necessary to increase the pressure resistance of the apparatus and the solvent per se is expensive. Thus, factors other than those for finishing must be considered.

(b) The removal of solvent is effected under reduced pressure.

(c) Apparatus in which the hydrogenated polymer solution to be treated can form such a thin film that the solvent can be volatilized at a high efficiency is used.

When a gel has been formed even according to the above (a) to (c) methods, or when a gel is formed because the (a) to (c) methods have not been used, the gel may be separated by filtration.

In this invention, any of these methods can effectively be utilized, and it is more effective to produce the hydrogenated norborene type (co)polymer by a combination of these methods.

When the hydrogenated norbornene type (co)polymer used in this invention is produced so that the water content of the hydrogenated polymer is 300 ppm or less, it can be easier to prevent silver streaks and fish eyes from being formed and the surface layer of the resulting molded article from being peeled off, and hence, a stable molding can be conducted.

When molding is conducted under severe conditions such as high temperature, high injection speed and the like, a good result can be obtained by inhibiting the water content of the hydrogenated polymer to 100 ppm or less.

In addition, when it is desired to conduct the molding stably for a long period of time, it is desirable to inhibit the water content of the hydrogenated polymer to 50 ppm or less.

Thus, in order to obtain a hydrogenated polymer having a lower water content, there can be used drying methods used in drying conventional polymers such as vacuum drying method, stream drying method using dried air or dried nitrogen and other methods.

When the halogen content of the hydrogenated norbornene type (co)polymer used in this invention is controlled to 100 ppm or less, a good result can be obtained in respect of formation of a gel and coloration. In particular, the halogen content is preferably 50 ppm or less, more preferably 20 ppm or less, and in this case, higher heat resistance can be obtained.

The method of preparing a hydrogenated norbornene type (co)polymer having a lower halogen content includes the following methods:

(i') A method of preparing a hydrogenated (co)polymer using a halogen-free catalyst and a halogen-free solvent (referring to hereinafter as Method (1')).

(ii') A method in which halogen atoms are removed during the preparation of a hydrogenated (co)polymer (e.g., extraction method and/or a method of adsorbing halogen atoms on hydrogenation catalyst) (referred to hereinafter as Method (ii')).

In order to enhance the degree of hydrogenation, the amount of water contained in the hydrogenation catalyst used in the hydrogenation is preferably less than 2% by weight, more preferably not more than 1% by weight, most preferably not more than 0.3% by weight.

When the hydrogenation is effected in the absence of a solvent, the water content of the unsaturated polymer is preferably less than 0.1% by weight because the degree of hydrogenation can be enhanced. When a solution of the unsaturated polymer in a solvent is subjected to hydrogenation, the water content of the unsaturated polymer solution is preferably less than 0.1% by weight, more preferably not more than 0.5% by weight, most preferably not more than 0.03% by weight. This is considered to be because when water is present in the unsaturated polymer solution, the water is adsorbed on the hydrogenation catalyst, as a result of which the surface of the hydrogenation catalyst becomes covered with the water, by which it becomes difficult for the unsaturated polymer to approach the hydrogenation active sites on the surface of the hydrogenation catalyst.

The transparent resin material of this invention can be stabilized by incorporating thereinto a known antioxidant such as 2,6-di-tert-butyl-4-methylphenol, 2,2'-dioxy-3,3'-di-tert-butyl-5,5'-dimethyldiphenylmethane, phenyl-β-naphthylamine or the like, or an ultraviolet absorber such as 2,4-dihydroxybenzophenone, 2-hydroxy-4-methoxybenzophenone, 2'-hydroxy-4-methoxy-2'-carbxybenzophenone or the like. It may further contain additives which are conventionally used in resin processing, such as lubricant and the like for improving its processability.

The transparent resin material of this invention can be formed into optical articles, etc. by various known modling methods such as injection molding, compression molding, extrusion molding and the like.

The transparent resin material of this invention can be improved in heat resistance, optical properties, chemical resistance, wear resistance, resistance to moisture permeability, etc. by hard-coating on the surface thereof an inorganic compound, an organic silicon compound (e.g. silane coupling agent or the like), an acrylic resin, a vinyl resin, a melamine resin, an epoxy resin, a fluoro resin, a silicone resin or the like according to a method such as thermal curing, ultraviolet curing, vacuum deposition, sputtering, ion plating or the like.

The transparent resin material of this invention can be used in admixture with various polymers. When it is mixed with a rubbery polymer, an impact-resistant polymer composition can be obtained. This rubbery polymer may be ordinary rubbery polymers requiring vulcanization prior to use, as well as thermoplastic elstomers which do not require vulcanization.

The rubbery polymers include, for example, α-olefins such as polyethylene, polypropylene and the like; ethylene-α-olefin copolymers such as ethylene-propylene random or block copolymer, ethylene-butylene random or block copolymer, and the like; ethylene-unsaturated carboxylic acid ester copolymers such as ethylene-methyl methacrylate copolymer, ethylene-butyl acrylate copolymer, and the like; copolymers of ethylene and an ester of vinyl alcohol with a fatty acid, such as ethylene-vinyl acetate copolymer and the like; polymers of an alkyl acrylate such as ethyl acrylate, butyl acrylate, hexyl acrylate, 2-ethylhexyl acrylate, lauryl acrylate or the like; ethylene-propylene-nonconjugated diene terpolymers such as ethylene-propylene-ethylidene-norbornene copolymer, ethylene-propylenehexadiene copolymer and the like; diene rubbers such as polybutadiene, styrene-butadiene random or block copolymer, acrylonitrile-butadiene copolymer, butadiene-isoprene copolymer and the like; butylene-isoprene copolymer; and hydrogenation products of a block copolymer of an aromatic hydrocarbon compound (e.g. styrene or the like) with an aliphatic diene hydrocarbon compound (e.g. butadiene, isoprene or the like). These rubbery polymers can be used alone or in combination of two or more.

The thermoplastic elastomers include, for example, aromatic vinyl-conjugated diene block copolymers such as styrene-butadiene block copolymer, hydrogenated styrene-butadiene block copolymer, styrene-isoprene block copolymer, hydrogenated styrene-isoprene block copolymer and the like; low-crystalline polybutadiene resin, ethylene-propylene elastomer, styrene-grafted ethylene-propylene elastomer, thermoplastic polyester elastomer, and ethylenic ionomer resin.

When the transparent resin material of this invention is mixed with a rubber-reinforced thermoplastic resin, an impact-resistant polymer composition can be obtained. Preferable examples of the rubber-reinforced thermoplastic resin include, for example, acrylonitrile-butadiene-styrene resin (ABS resin), acrylonitrile-ethylene-propylene-styrene resin (AES resin), methyl methacrylate-butadiene-styrene resin (MBS resin), acrylonitrile-butadiene-methyl methacrylate-styrene resin (ABMS resin), acrylonitrile-n-butyl acrylate-styrene resin (AAB resin) and rubber-modified polystyrene (high-impact polystyrene). These resins can be used alone or in combination of two or more.

When the transparent resin material of this invention is mixed with a ductile high polymer resin, an impact-resistant polymer composition can be obtained. The "ductile high polymer resin" refers to a high polymer resin having a brittle fracture-ductile fracture transition temperature of less than 25° C. Specific examples of the ductile high polymer resin includes a polycarbonate resin, a polyester resin, a polyamide resin, a polyethersulfone resin, a polysulfone resin and a polyimide resin.

When the transparent resin material of this invention is mixed with a brittle high polymer resin, a heat-resistant polymer composition can be obtained. The "brittle high polymer resin" refers to a high polymer resin having a brittle fracture-ductile fracture transition temperature of 25° C. or more. Specific examples of the brittle high polymer resin include a styrene resin, a vinyl chloride resin, an acrylic resin, a polyphenylene ether resin and a polyphenylene sulfide resin.

The above styrene resin includes a polystyrene, a polychlorostyrene, a poly-α-methylstyrene, a styrene-acrylonitrile copolymer, a styrene-methyl methacrylate copolymer, a styrene-maleic anhydride copolymer, a styrene-α-methylstyrene copolymer, a styrene-α-methylstyrene-methyl methacrylate terpolymer, a styrene-α-methylstyrene-acrylonitrile-methyl methacrylate quadripolymer, etc. These can be used alone or in combination of two or more.

The weight ratio of the hydrogenated ring opening (co)polymer and the other polymer to be mixed therewith is not critical but is preferably 10:90–90:10, more preferably 20:80–80:20, especially preferably 25:75–75:25 by weight.

The applications of the transparent resin material of this invention are not limited and the material can be used in a wide field. It can be used as a molding material requiring ordinary transparency, in automobile parts, lighting appliances, electric parts, sundry goods, etc. Further, it can be especially preferably used as an optical material in which optical properties are important, for example, in lenses for ordinary camera, video camera, telescope, laser beam, etc. and optical disks such as optical video disk, audio disk, document file disk, memory disk, etc.

Since the transparent resin material of this invention consists of a hydrogenation product of a (co)polymer of a compound represented by general formula (I) or a copolymer of said compound and other copolymerizable cyclic olefin monomer, it has excellent optical properties (i.e. high transparency and low birefringence), excellent heat resistance, high mechanical strengths, sufficient moisture resistance and good moldability.

DESCRIPTION OF PREFERRED EMBODIMENTS

This invention is described in more detail below referring to Examples. However, this invention is not restricted to these Examples.

Reference Example 1

To a nitrogen-purged reactor were fed 50 g of a monomer represented by structural formula (1) appearing hereinafter (8-methoxycarbonyltetracyclo-[4.4.0.1$^{2,5}$.1$^{7,10}$]-3-dodecene), 200 ml of 1,2-dichloroethane, 0.38 g of 1-hexane as a molecular weight modifier, and as a catalyst, 9.16 ml of a chlorobenzene solution containing 0.05 M/liter of $WCl_6$, 6.87 ml of a 1,2-dichloroethane solution containing 0.1 M/liter of paraldehyde and 3.7 ml of a toluene solution containing 0.5 M/liter of triisobutylaluminum, in a nitrogen atmosphere. The mixture was subjected to reaction at 60° C. for 10 hours to obtain 45 g of a polymer having an intrinsic viscosity ($\eta_{inh}$) of 0.78 dl/g as measured at 30° C. at a concentration of 0.5 g/dl in chloroform.

The polymer was press-molded at 300° C. to prepare test pieces. The test pieces were measured for glass transition temperature, water absorption and refractive index.

The test results are shown in Table 1.

Reference Example 2

The same procedure as in Reference Example 1 was repeated, except that the monomer represented by structural formula (1) was replaced by the same amount (50 g) of 8-methyl-8-methoxycarbonyltetracyclo-[4.4.0.1$^{2,5}$.1$^{7,10}$]-3-dodecene represented by structural formula (2) appearing hereinafter, to obtain 46 g of a polymer.

The polymer was subjected to the same press-molding as in Reference Example 1 to prepare test pieces. The test pieces were subjected to the same measurements as in Reference Example 1.

The test results are shown in Table 1.

Reference Example 3

The same procedure as in Reference Example 1 was repeated, except that the monomer of structural formula (1) was replaced by 25 g of (A) 8-methoxycarbonyltetracyclo[4.4.0.1$^{2,5}$.1$^{7,10}$]-3-dodecene represented by structural formula (1) and 25 g of (B) 5-methyl-5-methoxycarbonylbicyclo[2.2.1]-2-heptene represented by structural formula (3) appearing hereinafter, to obtain 44 g of a copolymer composed of 55 parts by weight of (A) and 45 parts by weight of (B).

The copolymer was subjected to the same press-molding as in Reference Example 1 to prepare test pieces. The test pieces were subjected to the same measurements as in Reference Example 1.

The test results are shown in Table 1.

Reference Example 4

The same procedure as in Reference Example 1 was repeated, except that the monomer of structural formula (1) was replaced by 42.5 g of 8-methyl-8-methoxycarbonyltetracyclo[4.4.0.1$^{2,5}$.1$^{7,10}$]-3-dodecene represented by structural formula (2) and 7.5 g of 5-methyl-5-cyclohexyloxycarbonylbicyclo[2.2.1]-2-heptene represented by structural formula (7) appearing hereinafter, to obtain a polymer having an intrinsic viscosity of 0.68 dl/g.

The polymer was subjected to the same press-molding as in Reference Example 1 to prepare test pieces. The test pieces were subjected to the same measurements as in Reference Example 1. The test results are shown in Table 1.

Reference Example 5

The same procedure as in Reference Example 1 was repeated, except that the monomer of structural formula (1) was replaced by 32.5 g of 8-methyl-8-methoxycarbonyltetracyclo[4.4.0.1$^{2,5}$.1$^{7,10}$]-3-dodecene of structural formula (2) and 17.5 g of 5-methyl-5-(4'-t-butylcyclohexyloxy)carbonylbicyclo[2.2.1]-2-heptene of structural formula (8) appearing hereinafter, to obtain a polymer having an intrinsic viscosity of 0.66 dl/g.

The polymer was subjected to the same press-molding as in Reference Example 1 to prepare test pieces. The test pieces were subjected to the same measurements as in Reference Example 1. The test results are shown in Table 1.

Reference Example 6

The same procedure as in Reference Example 1 was repeated, except that the monomer of structural formula (1) was replaced by 32.5 g of 8-methyl-8-methoxycarbonyltetracyclo[4.4.0.1$^{2,5}$.1$^{7,10}$]-3-dodecene represented by structural formula (2) and 17.5 g of 8-methyl-8-n-butoxycarbonyltetracyclo[4.4.0.1$^{2,5}$.1$^{7,10}$]-3-dodecene represented by structural formula (9) appearing hereinafter, to obtain a polymer having an intrinsic viscosity of 0.78 dl/g.

The polymer was subjected to the same press-molding as in Reference Example 1 to prepare test pieces. The test pieces were subjected to the same measurements as in Reference Example 1. The test results are shown in Table 1.

Reference Example 7

The same procedure as in Reference Example 1 was repeated, except that the monomer of structural formula (1) was replaced by 37.5 g of 8-methyl-8-methoxycarbonyltetracyclo[4.4.0.1$^{2,5}$.1$^{7,10}$]-3-dodecene represented by structural formula (2) and 12.5 g of 8-methyl-8-cyclohexyloxycarbonyltetracyclo[4.4.0.1$^{2,5}$.1$^{7,10}$]-3-dodecene represented by structural formula (10) appearing hereinafter, to obtain a polymer having an intrinsic viscosity of 0.86 dl/g.

The polymer was subjected to the same press-molding as in Reference Example 1 to prepare test pieces. The test pieces were subjected to the same measurements as in Reference Example 1. The test results are shown in Table 1.

Reference Example 8

The same procedure as in Reference Example 1 was repeated, except that the monomer of structural formula (1) was replaced by 20.0 g of 8-methyl-8-methoxycarbonyltetracyclo[4.4.0.1$^{2,5}$.1$^{7,10}$]-3-dodecene represented by structural formula (2) and 30.0 g of 8-methyl-8-tricyclo[5.2.1.0$^{2,6}$]-8-decyloxycarbonyltetracyclo[4.4.0.1$^{2,5}$.1$^{7,10}$]-3-dodecene represented by structural formula (11) appearing hereinafter, to obtain a polymer having an intrinsic viscosity of 0.83 dl/g.

The polymer was subjected to the same press-molding as in Reference Example 1 to prepare test pieces. The test pieces were subjected to the same measurements as in Reference Example 1. The test results are shown in Table 1.

Reference Example 9

The same procedure as in Reference Example 1 was repeated, except that the monomer of structural formula (1) was replaced by 40 g of 8-methyl-8-methoxycarbonyltetracyclo[4.4.0.1$^{2,5}$.1$^{7,10}$]-3-dodecene represented by structural formula (2) and 40 g of cyclopentene represented by structural formula (12) appearing hereinafter, to obtain a polymer having an intrinsic viscosity of 0.68 dl/g.

The polymer was subjected to the same molding as in Reference Example 1 to prepare test pieces. The test pieces were subjected to the same measurements as in Reference Example 1. The test results are shown in Table 1.

Comparative Example 1

Methyl methacrylate represented by structural formula (4) appearing hereinafter was polymerized to obtain a polymethyl methacrylate having an intrinsic viscosity of 0.26 dl/g. The polymer was subjected to press-molding at 240° C. to prepare test pieces. The test pieces were subjected to the same measurements as in Reference Example 1.

The test results are shown in Table 1.

Comparative Example 2

8-Methyltetracyclo[4.4.0.1$^{2,5}$.1$^{7,10}$]-3dodecene represented by structural formula (6) appearing hereinafter and having no polar substituent was subjected to reaction in n-butanol (solvent) in the presence of ruthenium trichloride hydrate to synthesize a ring opening polymer. The polymer was subjected to the same press-molding as in Example 1 to prepare test pieces. The test pieces were subjected to the same measurements as in Reference Example 1. The test results are shown in Table 1.

Comparative Example 3

A commercially available polycarbonate resin was subjected to the same press-molding as in Reference Example 1 to prepare test pieces. The test pieces were subjected to the same measurements as in Reference Example 1. The test results are shown in Table 1.

Example 1

20 g of the polymer obtained in Reference Example 1 was dissolved in 400 ml of toluene. Thereto were added 25 g of nickel naphthenate (nickel content: 5%) and 64 ml of a toluene solution containing 1 M/liter of triethylaluminum. Then, hydrogenation reaction was effected at 60° C. for 15 hours by feeding a hydrogen gas at a pressure of 50 kg/cm$^2$.

The resulting polymer was poured into a large excess of methanol acidified with hydrochloric acid, to decompose and remove the catalyst, after which the polymer was recovered and dried.

The polymer was press-molded at 300° C. to prepare test pieces. The test pieces were measured for properties. The test results are shown in Table 2.

Example 2

The same procedure as in Reference Example 1 was repeated, except that the monomer of structural formula (1) was replaced by 50 g of 8-methyl-8-methoxycarbonyltetracyclo[4.4.0.1$^{2,5}$.1$^{7,10}$]-3-dodecene represented by structural formula (2), to obtain a polymer having an intrinsic viscosity ($\eta_{inh}$) of 0.56 dl/g as measured at 30° C. at a concentration of 0.5 g/dl in chloroform. The polymer was hydrogenated in the same manner as in Example 1 to obtain a hydrogenated polymer.

The hydrogenated polymer was subjected to the same press-molding as in Example 1 to prepare test pieces. The test pieces were subjected to the same measurements as in Example 1.

The test results are shown in Table 2.

Example 3

The same procedure as in Reference Example 1 was repeated, except that the monomer of structural formula (1) was replaced by 42.5 g of 8-methyl-8-methoxycarbonyltetracyclo[4.4.0.1$^{2,5}$.1$^{7,10}$]-3-dodecene represented by structural formula (2) and 7.5 g of 5-methyl-5-cyclohexyloxycarbonylbicyclo[2.2.1]-2-heptene represented by structural formula (7) appearing hereinafter, to obtain a polymer having an intrinsic viscosity of 0.73 dl/g.

In 1,000 ml of tetrahydrofuran was dissolved 50 g of the polymer and the resulting solution was subjected to hydrogenation at 120° C. for 7 hours at a hydrogen gas pressure of 140 kg/cm$^2$ using 1.0 g of a Rh/C catalyst (Rh concentration=2%) to obtain a hydrogenated polymer having a hydrogenation degree of 70%. The catalyst was removed by filtration, and the hydrogenated polymer was coagulated and recovered. The polymer was subjected to the same press-molding as in Example 1 to prepare test pieces. The test pieces were subjected to the same measurements as in Example 1. The test results are shown in Table 2.

Example 4

The same procedure as in Reference Example 1 was repeated, except that the monomer of structural formula (1) was replaced by 40 g of 8-methyl-8-methoxycarbonyltetracyclo[4.4.0.1$^{2,5}$.1$^{7,10}$]-3-dodecene represented by structural formula (2) and 40 g of cyclopentene represented by structural formula (12), to obtain a polymer having an intrinsic viscosity of 0.74 dl/g.

The polymer was hydrogenated in the same manner as in Example 3 to prepare a hydrogenated polymer having a hydrogenation degree of 70%. The hydrogenated polymer was subjected to the same press-molding as in Example 1 to prepare test pieces. The test pieces were subjected to the same measurements as in Example 1. The test results are shown in Table 2.

Comparative Example 4

The polymer obtained in Comparative Example 2 was hydrogenated in tetrahydrofuran (solvent) at a hydrogen gas pressure of 50 kg/cm$^2$ in the presence of a Pd/diatomaceous earth catalyst (Pd concentration=2%) to obtain a hydrogenated polymer having a hydrogenation degree of 90%. The catalyst was removed by filtration, and the hydrogenated polymer was coagulated and recovered. Then, the polymer was subjected to the same press-molding as in Example 1 to prepare test pieces. The test pieces were subjected to the same measurements as in Example 1. The test results are shown in Table 2.

Structural formula (1)

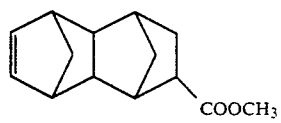

Structural formula (2)

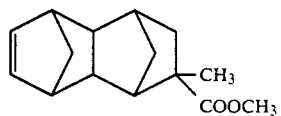

Structural formula (3)

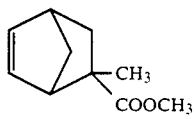

Structural formula (4)

$CH_2=\overset{CH_3}{\underset{}{C}}-COOCH_3$

Structural formula (5)

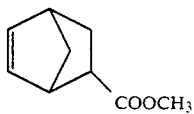

Structural formula (6)

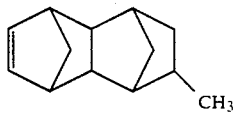

Structural formula (7)

Structural formula (8)

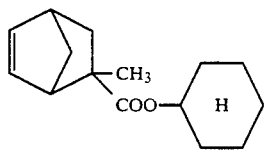

Structural formula (9)

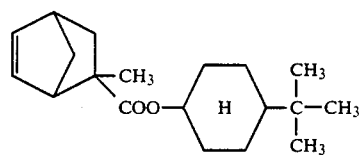

Structural formula (10)

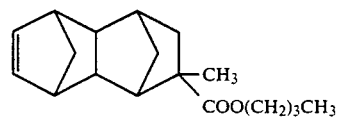

Structural formula (11)

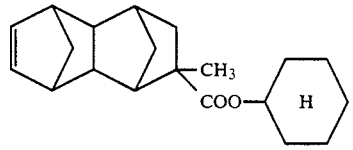

Structural formula (12)

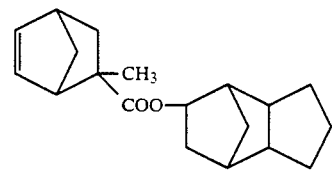

TABLE 1

| | Glass transition temperature (°C.) | Saturated water absorption (%) | Light transmittance (%) | Birefringence (nm) | Adhesion |
|---|---|---|---|---|---|
| Reference Example 1 | 206 | 0.55 | 87 | Below 20 | ○ |
| Reference Example 2 | 220 | 0.40 | 88 | Below 20 | ○ |
| Reference Example 3 | 165 | 0.58 | 87 | Below 20 | ○ |
| Reference Example 4 | 175 | 0.35 | 90 | Below 20 | ○ |
| Reference Example 5 | 142 | 0.30 | 90 | Below 20 | ○ |
| Reference Example 6 | 151 | 0.35 | 88 | Below 20 | ○ |
| Reference Example 7 | 170 | 0.33 | 90 | Below 20 | ○ |
| Reference Example 8 | 135 | 0.25 | 90 | Below 20 | ○ |
| Reference Example 9 | 165 | 0.35 | 90 | Below 20 | ○ |
| Comparative Example 1 | 100 | 2.00 | 93 | Below 20 | ○ |
| Comparative | 205 | 0.10 | 90 | Below 20 | X |

TABLE 1-continued

| | Glass transition temperature (°C.) | Saturated water absorption (%) | Light transmittance (%) | Birefringence (nm) | Adhesion |
|---|---|---|---|---|---|
| Example 2 Comparative Example 3 | 138 | 0.60 | 88 | Above 100 | ◯ |

TABLE 2

| | Hydrogenation degree (%) | Glass transition temperature (°C.) | Saturated water absorption (%) | Light transmittance (%) | Birefringence (nm) | Photodeterioration | Adhesion |
|---|---|---|---|---|---|---|---|
| Example 1 | 80 | 172 | 0.50 | 88 | Below 20 | No | ◯ |
| Example 2 | 80 | 188 | 0.35 | 90 | Below 20 | No | ◯ |
| Example 3 | 70 | 154 | 0.32 | 90 | Below 20 | No | ◯ |
| Example 4 | 70 | 146 | 0.30 | 89 | Below 20 | No | ◯ |
| Comparative Example 4 | 90 | 185 | 0.15 | 90 | Below 20 | No | X |

In Tables 1 and 2, the properties of each test piece were measured according to the following methods:

Glass transition temperature

Measured at a temperature elevation rate of 10° C./min in a nitrogen atmosphere using a differential scanning calorimeter.

Saturated water absorption

A test piece was immersed in water in order to allow the test piece to absorb water. The weight $W_1$ of the test piece when the water absorption had reached an equilibrium was measured. This test piece was then heated to 200° C. in a dry nitrogen stream and the amount $W_2$ of water released thereby was determined according to the Karl Fischer method. The saturated water absorption of the test piece was calculated from the following formula.

$$\text{Saturated water absorption (\%)} = [W_2/(W_1 - W_2)] \times 100$$

Birefringence

Measured using an ellipsometer.

Adhesion

Aluminum was vapor-deposited on a resin substrate. Using a cutter, 100 squares each of 1 mm × 1 mm were formed on the surface of the aluminum-deposited substrate, and these squares were subjected to a cellotape peeling test. When 10 or less squares were peeled, the adhesion of the resin substrate was indicated as O, and when 11 or more squares were peeled, the adhesion was indicated as X.

Hydrogenation degree

Using H-NMR spectrometry, there was measured the degree of the disappearance of the olefinic proton of a test piece polymer.

Photodeterioration

A test piece of 1 mm in thickness was irradiated with a light from a carbon arc lamp for 100 hours, using a fadeometer. Then, the coloring of the test piece was examined.

Example 5

A separable flask provided with a stirrer, a reflux condenser and a three-way stop-cock was purged with nitrogen gas. Therein were placed 100 parts by weight of 8-methyl-8-methoxycarbonyltetracyclo[4.4.0.1$^{2,5}$.1$^{7,10}$]-3-dodecene as a monomer, 12.1 parts by weight of 1-hexene as a molecular weight modifier and 400 parts by weight of n-butyl acetate as an organic solvent in a nitrogen stream. Further, thereto were added, as a catalyst, 1.7 parts by weight of a n-hexane solution containing 10% by weight of diethylaluminum chloride, 1.8 parts by weight of a chlorobenzene solution containing 2% by weight of tungsten hexachloride, and 0.1 part by weight of a n-butyl acetate solution containing 10% by weight of paraldehyde. The resulting mixture was subjected to metathesis ring opening polymerization at 60° C. for 5 hours. The conversion in this polymerization was 96%.

To the above ring opening polymer solution was added 100 parts by weight of an aqueous solution containing 20% by weight of triethanolamine, and the mixture was stirred. Then, the aqueous layer was separated. The resulting reaction mixture was placed in a pressure reactor. Thereto was added 10 parts by weight of an active carbon-supported palladium (palladium concentration = 5%) as a hdyrogenation catalyst, and hydrogenation reaction was effected at 150° C. for 4 hours at a hydrogen gas pressure of 10 kg/cm$^2$.

The resulting raction mixture was cooled, the hydrogen gas was released, the hydrogenation catalyst was removed by filtration, and methanol was added to the filtrate to coagulate a hydrogenated polymer. The polymer was then dried and recovered.

The yield of the hydrogenated polymer in the hydrogenation reaction was about 100%. The hydrogenated polymer was measured for infrared absorption spectrum and NMR spectrum to determine the hydrogenation degree, which was 100%.

In the above procedure, the removal of the hydrogenation catalyst by filtration was smooth and there was no reduction in molecular weight of polymer due to hydrogenation.

Example 6

Polymerization reaction and hydrogenation reaction were effected in the same manners as in Example 5, except that the n-butyl acetate as a solvent was replaced by a mixed solvent consisting of 80 parts by weight of n-butyl acetate and 20 parts by weight of cyclohexane. The polymer yield in the polymerization reaction was about 100%, the hydrogenation degree in the hydrogenation reaction was 100%, and there was no decomposition of n-butyl acetate.

Example 7

Polymerization reaction and hydrogenation reaction were effected in the same manners as in Example 5, except that the n-butyl acetate as a solvent was replaced by cyclohexane. The polymer yield in the polymerization reaction was about 100%, the hydrogenation degree in the hydrogenation reaction was 100%, and there was no decomposition of cyclohexane.

Example 8

Polymerization reaction and hydrogenation reaction were effected in the same manners as in Example 5, except that the n-butyl acetate as a solvent was replaced by dibutyl ether. The polymer yield in the polymerization reaction was about 100%, the hydrogenation degree in the hydrogenation reaction was 100%, and there was no decomposition of dibutyl ether.

Example 9

Polymerization reaction and hydrogenation reaction were effected in the same manners as in Example 5, except that the n-butyl acetate as a solvent was replaced by 1,2-diethoxyethane. The polymer yield in the polymerization reaction was about 100%, the hydrogenation degree in the hydrogenation reaction was 100%, and there was no decomposition of 1,2-diethoxyethane.

Example 10

Polymerization reaction and hydrogenation reaction were effected in the same manners as in Example 5, except that the n-butyl acetate as a solvent was replaced by methoxyethyl acetate. The polymer yield in the polymerization reaction was about 100%, the hydrogenation degree in the hydrogenation reaction was 100%, and there was no decomposition of methoxyethyl acetate.

Example 11

Polymerization reaction and hydrogenation reaction were effected in the same manners as in Example 5, except that the n-butyl acetate as a solvent was replaced by ethoxyethyl acetate. The polymer yield in the polymerization reaction was about 100%, the hydrogenation degree in the hydrogenation reaction was 100%, and there was no decomposition of ethoxyethyl acetate.

Reference Example 10

To a nitrogen-purged reactor were fed 1,760 g of 8-methyl-8-methoxycarbonyltetracyclo[4.4.0.1$^{2,5}$.1$^{7,10}$]-3-dodecene, 5,280 g of 1,2-dichloroethane and 190 g of 1-hexene as a molecular weight modifier. Thereto were further added 30 ml of a chlorobenzene solution containing 0.05 mole/liter of $WCl_6$, 15 ml of a 1,2-dichloroethane solution containing 0.1 mole/liter of paraldehyde and 47 ml of a n-hexane solution containing 80 mole/liter of diethylaluminum chloride. The mixture was subjected to reaction at 60° C. for 5 hours to obtain a polymer solution.

The conversion of the monomer to the polymer was 97.5%. The polymer had an intrinsic viscosity of 0.87 dl/g as measured at 30° C. at a concentration of 0.5 g/dl in chloroform.

To 100 parts by weight of the above polymer solution was added 100 parts by weight of a 1% by weight aqueous acetic acid solution. The mixture was vigorously stirred at room temperature for 10 minutes with a homomixer and then allowed to stand, whereby the organic layer was separated from the aqueous layer. The aqueous layer was discarded. The organic layer was washed with water, a 1% by weight aqueous sodium carbonate solution and water in this order and this washing procedure was repeated.

The resulting polymer solution was concentrated to dryness to obtain a polymer. The concentrations of tungsten, aluminum and chlorine in the polymer were determined. The glass transition temperature (Tg) of the obtained resin was measured. The results are shown in Table 3.

Reference Example 11

The same procedure as in Reference Example 10 was repeated, except that the 100 parts by weight of a 1% by weight aqueous acetic acid solution was replaced by 200 parts by weight of a 5% by weight aqueous acetic acid solution. The results are shown in Table 3.

Reference Example 12

The same procedure as in Reference Example 10 was repeated, except that the 100 parts by weight of a 1% by weight aqueous acetic acid solution was replaced by 150 parts by weight of a 0.5% by weight aqueous acetic acid solution. The results are shown in Table 3.

Reference Example 13

The same procedure as in Reference Example 10 was repeated, except that the 100 parts by weight of a 1% by weight aqueous acetic acid solution was replaced by 100 parts by weight of a 1% by weight aqueous oxalic acid solution. The results are shown in Table 3.

Reference Example 14

The same procedure as in Reference Example 10 was repeated, except that the 100 parts by weight of a 1% by weight aqueous acetic acid solution was replaced by 250 parts by weight of a 1% by weight aqueous citric acid solution. The results are shown in Table 3.

TABLE 3

| | Monomer used | De-catalyst agent | | | Residual metals and ions | | | $Tg^{*2}$ (°C.) | Color |
| --- | --- | --- | --- | --- | --- | --- | --- | --- | --- |
| | | Type | Concentration (%) | Amount used*$^1$ (parts by weight) | W (ppm) | Al (ppm) | Cl (ppm) | | |
| Reference Example 10 | Structural formula (2) | Acetic acid | 1 | 100 | 15 | 8 | 10 | 173 | Colorless and transparent |
| Reference Example 11 | Structural formula (2) | Acetic acid | 5 | 200 | 10 | 12 | 20 | 173 | Colorless and transparent |
| Reference Example 12 | Structural formula (2) | Acetic acid | 0.5 | 150 | 12 | 10 | 15 | 173 | Colorless and transparent |
| Reference | Structural | Oxalic acid | 1 | 100 | 10 | 14 | 15 | 173 | Colorless and |

TABLE 3-continued

| | Monomer used | De-catalyst agent | | | Residual metals and ions | | | Tg*2 (°C.) | Color |
|---|---|---|---|---|---|---|---|---|---|
| | | Type | Concentration (%) | Amount used*1 (parts by weight) | W (ppm) | Al (ppm) | Cl (ppm) | | |
| Example 13 | formula (2) | | | | | | | | transparent |
| Reference Example 14 | Structural formula (2) | Citric acid | 1 | 250 | 15 | 12 | 25 | 173 | Colorless and transparent |

Note:
*1 Amount per 100 parts by weight of polymer solution
*2 Glass transition temperature of recovered polymer In Reference Examples 10 to 14, measurements were made according to the following methods.

Intrinsic viscosity

The viscosity of a chloroform solution containing 0.5 g/dl of a sample polymer was measured at 30° C.

Monomer conversion

A given amount of a polymer solution produced from a known amount of a monomer charged was poured into a large excess of methanol to coagulate a polymer. The polymer was recovered and weighed. The conversion of the monomer was calculated from the polymer weight.

Tungsten concentration

An accurately weighed polymer was decomposed with concentrated sulfuric acid and hydrogen peroxide. The solution containing residual metals was subjected to dithiol absorptiometry, whereby the tungsten concentration in the polymer was determined.

Aluminum concentration

A tetrahydrofuran (THF) solution of an accurately weighed polymer was subjected to atomic absorption spectrometry, whereby the aluminum concentration in the polymer was determined.

Chlorine concentration

Determined according to fluorescent X-ray analysis.

Glass transition temperature (Tg)

Measured at a temperature elevation rate of 10° C./min in a nitrogen atmosphere according to differential scanning calorimetry.

Example 12

To a nitrogen-purged reactor were fed 1,760 g of 8-methoxycarbonyltetracyclo[4.4.0.1$^{2,5}$.1$^{7,10}$]π-3-dodecene, 5,280 g of toluene and 130 g of 1-hexene as a molecular weight modifier. Thereto was added, as a ring opening polymerization catalyst, 30 ml of a toluene solution containing 0.05 mol/liter of $WCl_6$, 15 ml of a toluene solution containing 0.1 mol/liter of paraldehyde and 47 ml of a n-hexane solution containing 0.8 mol/liter of diethylaluminum chloride. The mixture was subjected to polymerization reaction at 50° C. for 5 hours. To the reaction mixture was added 7 liters of an aqueous solution containing 350 g of triethanolamine, and the mixture was stirred to transfer the catalyst into the aqueous phase. Then, the organic phase was subjected to steam stripping to remove the solvent and water simultaneously. The resulting solid was dried to obtain 1,670 g of a polymer.

The 1,670 g of polymer obtained was dissolved in 17 liters of tetrahydrofuran. Thereto was added 167 g of a palladium-alumina catalyst (palladium concentration=5%) as a hydrogenation catalyst. The mixture was subjected to hydrogenation reaction at 165° C. for 5 hours at a hydrogen gas pressure of 10 kg/cm$^2$. After the completion of the reaction, the hydrogenation catalyst was removed from the reaction mixture to obtain a polymer solution (hereinafter referred to as Polymer Solution A). The hydrogenation degree of the polymer in this hydrogenation reaction was 100%.

Five liters of Polymer Solution A was added to 50 liters of a mixed solvent consisting of 40 parts by volume of tetrahydrofuran and 60 parts by volume of methanol, in one hour with stirring, whereby a solid was coagualted. The solid was collected by filtration, and the resulting polymer was added to 5 liters of methanol and heated for 6 hours under reflux. The solid was separated by filtration and dried to recover a polymer.

The polymer was then measured for properties. The results are shown in Table 4. Glass transition temperature was measured by a differential scanning calorimeter. Mw/Mn is a ratio of a weight-average molecular weight Mw to a number-average molecular weight Mn. The content of low-molecular weight polymer is a content of low-molecular weight polymers having a molecular weight of 3000 or less. Molecular weight was determined by gel permeation chromatography.

The above polymer was molded to obtain a molded article having a Dynstat impact strength of 1,600 kg/cm$^2$. The article contained no foam and had a smooth surface with no adhesion.

Example 13

The same procedure as in Example 12 was repeated, except that the mixed solvent was replaced by a mixed solvent consisting of 30 parts by volume of tetrahydrofuran and 70 parts by volume of methanol, to recover a polymer. The properties of this polymer and the molded article produced therefrom are shown in Table 4. The molded article contained no foam and had a smooth surface with no adhesion.

Example 14

The same procedure as in Example 12 was repeated, except that the mixed solvent was replaced by a mixed solvent consisting of 20 parts by volume of tetrahydrofuran and 80 parts by volume of methanol, to recover a polymer. The properties of this polymer and the molded article produced therefrom are shown in Table 4. The molded article contained no foam and had a smooth surface with no adhesion.

Example 15

The same procedure as in Example 12 was repeated, except that the mixed solvent was replaced by a mixed solvent consisting of 10 parts by volume of tetrahydrofuran and 90 parts by volume of methanol, to recover a polymer. The properties of this polymer and the molded article produced therefrom are shown in Table 4. The molded article contained no foam and had a smooth surface with no adhesion.

from are shown in Table 4. The molded article contained no foam and had a smooth surface with no adhesion.

TABLE 4

| | Mixed solvent | | Glass transition temperature (°C.) | Mw/Mn | Content of low-molecular weight polymer (%) | Concentration of residual monomer (ppm) | Dynstat impact strength (kg/cm²) | Molded article | |
|---|---|---|---|---|---|---|---|---|---|
| | Composition*¹ | Volume ratio | | | | | | Foam | Surface adhesion |
| Example 12 | THF/MeOH | 40:60 | 174 | 3.91 | 0 | 200 | 1600 | No | No |
| Example 13 | THF/MeOH | 30:70 | 174 | 4.02 | 0 | 240 | 1400 | No | No |
| Example 14 | THF/MeOH | 20:80 | 174 | 4.21 | 0 | 260 | 1300 | No | No |
| Example 15 | THF/MeOH | 10:90 | 173 | 4.31 | 0 | 280 | 1100 | No | No |
| Example 16 | BuAc/MeOH | 40:60 | 174 | 3.55 | 0 | 200 | 1600 | No | No |

Note:
*¹THF = Tetrahydrofuran, MeOH = Methanol, BuAc = n-Butyl acetate

Example 16

A polymer solution was obtained by repeating the same procedure as in Example 12, except that the tetrahydrofuran as a hydrogenation solvent was replaced by n-butyl acetate (said polymer solution is hereinafter referred to as Polymer Solution B). The hydrogenation degree of this polymer was 100%.

A polymer was recovered by repeating the same procedure as in Example 12, except that 50 liters of a mixed solvent consisting of 60 parts by volume of n-butyl acetate and 40 parts by volume of methanol was used per 5 liters of Polymer Solution B. The properties of this polymer and the molded article produced therefrom are shown in Table 4. The molded article contained no foam and had a smooth surface with no adhesion.

Examples 17–27 and Comparative Examples 5–15

The hydrogenated ring opening polymer of this invention, that is, the poly(3,5-(8-methyl-8-methoxycarbonyltricyclo[5.2.1.0$^{2,6}$]decylene)ethylene) (hereinafter referred to as "A Polymer") produced in Example 12 or the poly(3,5-(8-methyl-8-ethoxycarbonyltricyclo[5.2.1.0$^{2,6}$]decylene)ethylene) (hereinafter referred to as "B Polymer") produced by repeating the same procedure as in Example 12, except that 1,760 g of 8-ethoxycarbonyltetracyclo[4.4.0.1$^{2,5}$,1$^{7,10}$]-3-dodecene was substituted for the starting material, was mixed with other polymer to prepare various compositions. The compositions were measured for properties. The results are shown in Table 5.

TABLE 5

| | Hydrogenated ring opening polymer | | Other polymer | | Tensile strength (Kg/cm²) | Elongation at break (%) | Dynstat impact strength (Kg/cm²) | Heat distortion temperature (°C.) |
|---|---|---|---|---|---|---|---|---|
| | Type | Amount | Type | Amount | | | | |
| Example 17 | A | 85 | Styrene-butadiene block copolymer*¹ | 15 | 470 | 160 | 1540 | — |
| Example 18 | B | 80 | Polybutadiene resin*² | 20 | 470 | 160 | 1650 | — |
| Comparative Example 5 | — | — | Styrene-butadiene block copolymer*¹ | 100 | 280 | 800 | Above 2500 | — |
| Comparative Example 6 | — | — | Polybutadiene resin*² | 100 | 110 | 700 | Above 2500 | — |
| Example 19 | A | 50 | ABS resin*³ | 50 | 560 | 46 | 1070 | — |
| Comparative Example 7 | — | — | ABS resin*³ | 100 | 530 | 54 | 970 | — |
| Example 20 | A | 75 | Polycarbonate | 25 | 680 | 45 | 900 | — |
| Example 21 | A | 75 | Polybutylene terephthalate | 25 | 610 | 110 | 810 | — |
| Example 22 | A | 75 | Polyarylate | 25 | 675 | 120 | 1200 | — |
| Example 23 | A | 75 | Polyamide (nylon 6) | 25 | 665 | 65 | 780 | — |
| Comparative Example 8 | — | — | Polycarbonate | 100 | 715 | 85 | 1900 | — |
| Comparative Example 9 | — | — | Polybutylene terephthalate | 100 | 560 | 300 | 1550 | — |
| Comparative Example 10 | — | — | Polyarylate | 100 | 770 | 110 | 1850 | — |
| Comparative Example 11 | — | — | Polyamide (nylon 6) | 100 | 720 | 115 | 1350 | — |
| Example 24 | A | 15 | Polystyrene | 85 | 550 | 3 | — | 106 |
| Example 25 | A | 15 | Styrene-methyl methacrylate copolymer | 85 | 565 | 3 | — | 106 |
| Example 26 | A | 15 | Polyvinyl chloride | 85 | 550 | 3 | — | 89 |
| Example 27 | B | 35 | Styrene-acrylonitrile copolymer | 65 | 650 | 3 | — | 117 |
| Comparative Example 12 | — | — | Polystyrene | 100 | 540 | 3 | — | 96 |
| Comparative Example 13 | — | — | Styrene-methyl methacrylate copolymer | 100 | 570 | 4 | — | 95 |
| Comparative Example 14 | — | — | Polyvinyl chloride | 100 | 550 | 3 | — | 75 |
| Comparative | — | — | Styrene-acrylonitrile | 100 | 750 | 4 | — | 94 |

TABLE 5-continued

| | Hydrogenated ring opening polymer | | Other polymer | | Tensile strength | Elongation at break | Dynstat impact strength | Heat distortion temperature |
|---|---|---|---|---|---|---|---|---|
| | Type | Amount | Type | Amount | (Kg/cm$^2$) | (%) | (Kg/cm$^2$) | (°C.) |
| Example 15 | | | copolymer | | | | | |

Note:
*[1] TR2000, a product of Japan Synthetic Rubber Co., Ltd.
*[2] RB820, a product of Japan Synthetic Rubber Co., Ltd.
*[3] ABS No. 47, a product of Japan Synthetic Rubber Co., Ltd.

Reference Example 15

Polymer Solution A'

Into a 500-ml pressure glass bottle were charged 40 g of 8-methyl-8-methoxycarbonyltetracyclo[4.4.0.1$^{2,5}$.1$^{7,10}$]-3-dodecene having structural formula (2), 24 g of 1,2-dimethoxyethane, 96 g of cyclohexane, 4.0 g of 1-hexene and 1.09 ml of a 1.58 mole/liter solution of diethylzinc in n-hexanoic acid. Subsequently, 3.45 ml of a 0.05 mole/liter solution of hexaphenoxytungsten in 1,2-dimethoxyethane was added to the mixture in the pressure glass bottle. The pressure glass bottle was tightly stoppered, and then, the mixture was heated to 80° C. and stirred for 3 hours. The resulting polymer solution was subjected to GPC analysis to determine the amount of the remaining compound of structural formula (2). As a result, it was found that the conversion of the monomer into the polymer was 82.3%.

To the polymer solution obtained was added a mixed solvent consisting of 1,2-dimethoxyethane and cyclohexane (2:8 by weight) to adjust the polymer/solvent ratio to 1:10 by weight, after which 2 g of triethanolamine was added. The resulting mixture was stirred for 10 minutes.

The polymer solution thus obtained is indicated as Polymer Solution A'.

Reference Example 16

Polymer Solution B'

Into a 100-ml pressure glass bottle were charged 10 g of a compound of structural formula (2), 24 g of cyclohexane, 2.5 g of 1-hexene and 0.34 ml of a 0.96 mole/liter solution of diethylaluminum chloride in toluene.

On the other hand, 2 ml of a 0.05 mole/liter solution of hexachlorotungsten in 1,2-dimethoxyethane was mixed with 1 ml of a 0.1 mole/liter solution of paraldehyde in 1,2-dimethoxyethane solution in a separate flask.

To the mixture in the pressure glass bottle was added 0.49 ml of the mixed solution obtained above and the pressure bottle was tightly stoppered, after which the mixture was heated to 80° C. and then stirred for 3 hours. The polymer solution thus obtained was subjected to GPC analysis to determine the amount of the remaining compound of structural formula (2). As a result, it was found that the conversion of the monomer into the polymer was 98.3%.

To the polymer solution thus obtained was added a mixed solvent consisting of 1,2-dimethoxyethane and cyclohexane (2:8 by weight) to adjust the polymer/solvent ratio to 1:10 by weight. Thereafter, 2 g of triethanolamine was added thereto and the resulting mixture was stirred for 10 minutes.

The polymer solution thus obtained is indicated as Polymer Solution B'.

Example 28

Synthesis of hydrogenated polymer under halogen atom-free conditions

To Polymer Solution A' as obtained in Reference Example 15 under halogen atom-free conditions was added 2 g of palladium-silica magnesia (palladium=5%) (manufactured by Nikki Kagaku K. K.), and the resulting mixture was subjected to reaction in an autoclave at a hydrogen pressure of 40 kg/cm$^2$ at 165° C. for 4 hours.

The hydrogenation catalyst was removed by filtration, and the hydrogenated polymer solution was subjected to methanol coagulation. The hydrogenated polymer obtained was dried and thereafter measured for various physical properties.

The results obtained are shown in Table 6.

Example 29

Dehalogenation by extraction method and two extractions

To Polymer Solution B' was added 50 g of methanol, and the resulting mixture was stirred for 30 minutes and then allowed to stand. The mixture was separated into two layers, the upper layer of which was then removed and methanol was again added to the remaining layer. The resulting mixture was stirred and then allowed to stand, after which the upper layer was removed. The same procedure as above was repeated again, and the lower layer obtained was appropriately diluted with cyclohexane and 1,2-dimethoxyethane to obtain a polymer solution in cyclohexane-1,2-diemthoxyethane having a polymer concentration of 10%.

The polymer solution thus obtained was subjected to hydrogenation reaction with the same hydrogenation catalyst under the same conditions as in Example 28.

After the hydrogenation reaction, the hydrogenation catalyst was removed by filtration and a part of the polymer solution thus obtained was subjected to methanol coagulation and then measurement of various physical properties in the same manner as in Example 28. The other part of the polymer solution was subjected to solvent removal and pelletization by heat-melting under reduced pressure. The amount of gel in the pellet and the discolorability of the pellet were evaluated.

The results obtained are shown in Table 6.

Examples 30 and 31

Dehalogenation by extraction method

The same procedure as in Example 29 was repeated, except that the extraction procedure was repeated three times or five times, to obtain hydrogenated polymers. The results obtained are shown in Table 6.

TABLE 6

|  | Example 28 | Example 29 | Example 30 | Example 31 |
| --- | --- | --- | --- | --- |
| Type of polymer solution | A' | B' | B' | B' |
| Number of extractions | 0 | 2 | 3 | 5 |
| Chlorine content in hydrogenated polymer (ppm) | <1 | 10 | 5 | 2 |
| Hydrogenation degree | >99 | >99 | >99 | >99 |
| Gel content in cast film | No gel was found visually. | Same as left | Same as left | Same as left |
| Discolorability in cast film | Substantially no discoloration was found visually. | Same as left | Same as left | Same as left |
| Gel content in pelletization (number of particles) | 0 | 0 | 0 | 0 |
| Discolorability in pelletization (YI vlues) | 1.2 | 2.0 | 1.8 | 2.2 |

Determination of chlorine content

The chlorine content in the hydrogenated polymer was determined by a fluorescent X-rays method.

Evaluation of gel content and discolorability in cast film:

The evaluation was effected by heating a cast film. That is, a chloroform solution of a hydrogenated polymer having a solid concentration of 10% was prepared, and 5 ml thereof was placed on an aluminum dish, air-dried overnight and further dried at 80° C. for 2-3 hours in a vacuum dryer. Subsequently, this cast film was heated together with the dish at 280° C. for 30 minutes in a Geer oven and the degree of discoloration was evaluated by visual comparison. The gel content was judged by adding chloroform to the film after heating and comparing the amount of gel which was not dissolved.

Evaluation of gel content and discolorability in pelletization

The hydrogenated polymer solution after the hydrogenation was heated and melted at 310° C. at a reduced pressure of 20 mmHg in a solvent-removing apparatus which was provided with a plate fin type heat-exchanger and could be evacuated, thereby removing the solvent, after which the polymer obtained was pelletized.

Twenty grams of the resulting pellets were press-molded into a disk by means of a hot press at 280° C. The gel content was evaluated by counting the number of gel particles seen in the disk. The discolorability was evaluated by measuring the hue (YI value) of a 15% methylene chloride solution of the pellets according to JIS K7103. The smaller the YI value, the lower the degree of yellowing.

Example 32

To the Polymer Solution A' obtained in Reference Example 15 was added 50 g of methanol and the resulting mixture was stirred for 30 minutes and allowed to stand. The mixture was separated into two layers, and the upper layer thereof was removed. Methanol was again added to the remaining layer, and the resulting mixture was stirred and allowed to stand. The mixture was separated into two layers and the upper layer thereof was removed. The same procedure as above was repeated twice more. The lower layer obtained was appropriately diluted with cyclohexane and 1,2-dimethoxyethane to obtain a cyclohexane-1,2-dimethoxyethane solution of the polymer having a polymer concentration of 10%.

To this polymer solution was added 2 g of palladium-silica magnesia (palladium=5%) (manufactured by Nikki Kagaku K. K.), and the resulting mixture was subjected to reaction at a hydrogen pressure of 40 kg/cm$^2$ at 165° C. for 4 hours in an autoclave, after which the catalyst was removed by filtration to obtain a hydrogenated polymer solution (referred to hereinafter as Hydrogenated Polymer Solution A').

This Hydrogenated Polymer Solution A' was subjected to methanol coagulation to obtain a hydrogenated polymer (referred to hereinafter as Hydrogenated Polymer A').

The above Hydrogenated Polymer Solution A' was subjected to removal of solvent at 280° C. under reduced pressure. The molten resin thus obtained was pelletized by an extruder in a nitrogen atmosphere, and formed into sheet by injection molding or extrusion molding, whereby the moldability was evaluated. The results obtained are shown in Table 7.

Example 33

To the Hydrogenated Polymer Solution A' obtained in Example 32 was added pentaerythritol-tetrakis[3-(3,5-di-t-butyl-4-hydroxyphenyl)propionate], which is an antioxidant, in a proportion of 0.1% based on the weight of the hydrogenated polymer, and the resulting mixture was subjected to solvent-removal at 380° C. under reduced pressure.

The molten resin thus obtained was pelletized by an extruder in a nitrogen atmosphere and the pellets were formed into a sheet by injection molding or extrusion molding, whereby the moldability was evaluated. The results obtained are shown in Table 7.

Example 34

The Hydrogenated Polymer A' obtained in Example 32 was dried at 100° C. for 4 hours in a vacuum dryer, and thereafter, pelletized by an extruder in a nitrogen atmosphere. The pellets thus obtained were formed into a sheet by injection molding, whereby the moldability was evaluated. The results obtained are shown in Table 7.

Example 35

The Hydrogenated Polymer A' obtained in Example 32 was dried at 120° C. for 4 hours in a vacuum dryer, and thereafter, pelletized by an extruder in a nitrogen atmosphere. The pellets obtained were formed into a sheet by injection molding to evaluate the moldability. The results obtained are shown in Table 7.

Example 36

The Hydrogenated Polymer A' obtained in Example 32 was dried at 120° C. for 8 hours in a vacuum dryer, and thereafter, pelletized by an extruder in a nitrogen atmosphere. The pellets obtained were formed into a sheet by injection molding to evaluate the moldability. The results obtained are shown in Table 7.

Example 37

The Hydrogenated Polymer A' obtained in Example 32 was dried at 100° C. for 24 hours in a nitrogen stream dryer and thereafter pelletized by an extruder in a nitrogen atmosphere. The pellets obtained were formed into a sheet by injection molding to evaluate the moldability. The results obtained are shown in Table 7.

Gel content

Sheet-formability (extrusion-moldability)

The hydrogenated polymer was formed into a sheet by means of an extruder having a diameter of 30 mm through a T-die having a width of 20 mm and a thickness of 1 mm at a temperature of 220°-280° C. The amount of fish eyes in the sheet thus obtained was evaluated based on the number of fish eyes per unit area.

Injection-moldability

The hydrogenated polymer was pelletized by means of an extruder having a diameter of 30 mm at a temperature of 220°-280° C., and thereafter, the pellets thus obtained were successively injection-molded into a disk having a diameter of 130 mm by means of an extruder manufactured by SUMITOMO HEAVY INDUSTRIES, LTD. (DISK 5M III) at a temperature of 340°-380° C. at a 30-second cycle. The disk thus obtained was visually checked as to whether or not silver streaks and fish eyes were formed and whether or not peeling was caused.

TABLE 7

| Example No. | 32 | 33 | 34 | 35 | 36 | 37 |
|---|---|---|---|---|---|---|
| Hydrogenated polymer | A' | A' | A' | A' | A' | A' |
| Solvent-removal temperature (°C.) | 280 | 380 | — | — | — | — |
| Drying method | — | — | Vacuum | Vacuum | Vacuum | In N$_2$ stream |
| Drying temperature (°C.) | — | — | 100 | 120 | 120 | 100 |
| Drying time (hr) | — | — | 4 | 4 | 8 | 24 |
| Pelletization atmosphere | N$_2$ | N$_2$ | N$_2$ | N$_2$ | N$_2$ | N$_2$ |
| Antioxidant | No | Yes | Yes | Yes | Yes | Yes |
| Gel content (%) | 0.01 | 0.01 | 0.01 | 0.01 | 0.01 | 0.1 |
| Water content (%) | 270 | 180 | 100 | 60 | 30 | 110 |
| Evaluation results | | | | | | |
| Injection molding Temperature (°C.) | 340 | 360 | 340 | 360 | 340 380 | 340 |
| Silver streaks | No silver streak was found visually on disk | Same as left | Same as left | Same as left | Same as left Same as left | Same as left |
| Fish eyes | No fish eye was found visually on disk | Same as left | Same as left | Same as left | Same as left Same as left | Same as left |
| Peeling* | No peeling | No peeling | No peeling | No peeling | No peeling No peeling | No peeling |
| Extrusion molding Temperature (°C.) | 280 | 280 | 280 | 280 | 280 | 280 |
| Fish eyes | No fish eye was found visually on disk | Same as left | Same as left | Same as left | Same as left | Same as left |

Note:
*Peeling of the surface of molded article due to adhesion of resin to a mold during the molding.

In chloroform was dissolved 50 g of the hydrogenated polymer at a temperature of 25° C. to form a hydrogenated polymer solution in chloroform having a polymer concentration of 1%, and this solution was filtered through a membrane filter having a pore diameter of 0.5 μm (manufactured by Advantech Toyo K. K.) which filter was previously weighed. The filter after the filtration was dried and weighed. The gel content was calculated from the increased weight.

Water content

In a Karl-Fischer moisture measuring apparatus (CA-5, VA-21, manufactured by Mitsubishi Kasei Corp.), the hydrogenated polymer was heated to 200° C. in a dried nitrogen stream and the amount of water generated was determined.

Example 38

Production of norbornene polymer

Under a nitrogen atmosphere, 500 g of 8-methyl-8-methoxycarbonyltetracyclo[4.4.0.1$^{2,5}$.1$^{7,10}$]-3-dodecene, which is a norbornene ring-containing monomer, 1,700 ml of toluene, 83 g of 1-hexene as a molecular weight regulator, 8.5 ml of a solution of tungsten hexachloride as a metathesis catalyst in chlorobenzene having a concentration of 0.05 mole/liter, 4.3 ml of a solution of paraldehyde in 1,2-dichloroethane having a concentration of 0.1 mole/liter and 11 ml of a solution of diethylaluminum chloride in toluene having a concentration of 0.08 mole/liter were charged into a reactor, and the resulting mixture was subjected to reaction at 60° C. for 4 hours. The resulting polymerization mixture was poured into a large amount of methanol to separate a polymer, and the polymer was subjected to filtration, washing and drying to obtain 480 g of an unsaturated polymer (metathesis polymer) having an intrinsic viscosity ($\eta_{inh}$) of 0.45 dl/g as measured at 30° C. in chloroform at a concentration of 0.5 g/dl.

The metathesis polymer thus produced was vacuum-dried at 120° C. and 40 g of the thus dried polymer was dissolved in 360 g of a mixture of dehydrated cylohexane and dimethoxyethane (80/20 by weight). The polymer solution thus obtained was charged into an autoclave provided with an electromagnetic stirrer. The water content of the polymer solution was 110 ppm.

Preparation of SiO$_2$·MgO carrier

To 6 liters of 0.2 N aqueous sodium silicate solution was dropwise added 300 liters of 4 N aqueous magnesium chloride solution with vigorous agitation, after which the resulting mixture was aged with stirring for 30 minutes. The precipitates obtained were washed with several times with a diluted aqueous magnesium chloride solution (about 0.01 mole/liter) by a decantation method, and finally washed with distilled water and then subjected to filtration and drying at 110° C. The dried precipitates were then calcined at 450° C. for 2 hours and thereafter sieved to obtain silica magnesia [SiO$_2$·MgO carrier (specific surface area=450 m$^2$/g, average particle diameter=10$\mu$)].

Preparation of hydrogen catalyst

To 2.5 g of palladium chloride were added 120 ml of pure water and 7 ml of 36% conc. hydrochloric acid, and the resulting mixture was heated to form a solution. Pure water was added to the solution to adjust the total volume to 1.2 liters. As a carrier, 50 g of the silica magnesia prepared above was placed on an evaporating dish and the whole of the palladium chloride solution previously prepared was little by little added thereto while heating the dish on a water bath, after which the resulting mixture was vaporized to dryness by continuing the heating on a water bath for 2 hours. The mixture thus obtained was calcined at 500° C. for 5 hours in nitrogen and subsequently reduced in a hydrogen stream at 450° C. for 3 hours to prepare a hydrogenation catalyst.

The thus obtained polymer solution was placed in an autoclave and 2 g of the dried product of the 3% palladium catalyst supported on the silica magnesia carrier prepared above (water content=0.22%) was added thereto.

Subsequently, hydrogen was introduced into the autoclave, and the inner temperature of the autoclave was elevated to 150° C. with stirring, and when the temperature reached 150° C. the pressure was 35 kg/cm$^2$. The temperature was kept at 150° C. for 5 hours, and thereafter returned to room temperature, after which the hydrogen was discharged. Thereafter, the reaction mixture was suction-filtered through a 5C. filter paper. The polymer solution thus obtained was added to a large amount of methanol with stirring to deposit a polymer. The polymer thus obtained was dried, and then subjected to measurement of hydrogenation degree by NMR. The hydrogenation degree was 100%.

The hydrogenation catalyst recovered by filtration was washed with a solvent (a 80/20 mixture of cyclohexane and dimethoxyethane), and then dried, after which it was repeatedly used in a further hydrogenation. The washing and drying of the catalyst were effected every time. Incidentally, the polymer solution had a water content of 100-120 ppm. The hydrogenation degree in the 5th hydrogenation was 100%, and the activity was not reduced.

Comparative Example

The same procedure as in Example 38 was repeated, except that the drying of solvent and drying of hydrogenation catalyst were not effected, the polymer solution used had a water content of 1,000 ppm and the catalyst used had a water content of 4.9%. The hydrogenation degree was 98%. The hydrogenated catalyst recovered on a filter paper was washed in the same manner as in Example 38 without drying, and repeatedly used in a further hydrogenation in the same manner as in Example 38, in which the polymer solution used had a water content of 1,000 ppm. The activity in the 5th hydrogenation was 97%.

What is claimed is:

1. A transparent resin material consisting of a hydrogenation product of a (co)polymer obtained by subjecting at least one compound represented by general formula (I) or a combination of at least 5% by weight of said compound and 95% by weight or less of other copolymerizable cyclic olefin monomer to metathesis polymerization:

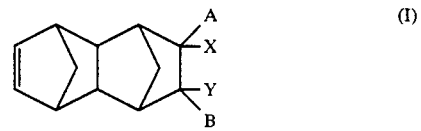

wherein A and B are independently hydrogen atoms or $C_{1-10}$ hydrocarbon groups, X is a hydrogen atom or a $C_{1-10}$ hydrocarbon group and Y is a —(CH$_2$)$_n$COOR$^1$ group or a —(CH$_2$)$_n$OCOR$^1$ group wherein R$^1$ is a $C_{1-20}$ hydrocarbon group and n is 0 or an integer of 1-10, wherein the cyclic olefin monomer is a nonpolar cyclic olefin selected from the group consisting of cyclopentene, cyclooctene, 1,5-cyclooctadiene, 1,5,9-cyclododecatriene bicyclo[2.2.1]-2-heptene, tricyclo[5.2.1.0$^{2,6}$]-8-decene, tricyclo[5.2.1.0$^{2,6}$]-3-decene, tricyclo[6.2.1.0$^{1,8}$]-9-undecene, tricyclo[6.2.1.0$^{1,8}$]-4-undecene, tetracyclo[4.4.0.1$^{2,5}$.1$^{7,10}$]-3-dodecene, pentacyclo[6.5.1.1$^{3,6}$.0$^{2,7}$.0$^{9,13}$]-4-pentadecene, pentacyclo[6.6.1.1$^{3,6}$.0$^{2,7}$.0$^{9,14}$]-4-hexadecene and pentacyclo[6.5.1.1$^{3,6}$.0$^{2,7}$.0$^{9,13}$-11-pentadecene, or is a polar substituent-containing bicyclo[2.2.1]-2-heptene derivative represented by general formula (II):

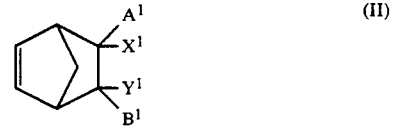

wherein A$^1$ and B$^1$ are independently hydrogen atoms or $C_{1-10}$ hydrocarbon groups, X$^1$ represents hydrogen atom or a $C_{1-10}$ hydrocarbon group and Y$^1$ represents a halogen atom, a halogen-substituted $C_{1-10}$ hydrocarbon group, —(CH$_2$)$_n$COOR$^1$ group, —(CH$_2$)$_n$OCOR$^1$ group, —(CH$_2$)$_n$OR$^1$ group, —(CH$_2$)$_n$CN group, —(CH$_2$)$_n$CONR$^2$R$^3$ group, —(CH$_2$)$_n$COOZ group, —(CH$_2$)$_n$OZ group or —(CH$_2$)$_n$W group wherein R$^1$, R$^2$ and R$^3$ are independently $C_{1-10}$ hydrocarbon groups, Z is a halogen-substituted hydrocarbon group, W is $SiR^5_pD_{3-p}$ wherein $R^5$ is a $C_{1-10}$ hydrocarbon group, D is a halogen atom, $-OCOR^5$ group or $-OR^5$ group wherein $R^5$ is as defined above, and p is 0 or an integer of 1-3, n is 0 or an integer of 1-10, and $X^1$ and $Y^1$ may form together

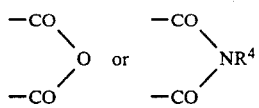

wherein $R^4$ is a $C_{1-10}$ hydrocarbon group.

2. The transparent resin material according to claim 1, wherein $Y^1$ is a $-(CH_2)_nCOOR^1$ group or a $-(CH_2)_nOCOR^1$ group wherein $R^1$ is a $C_{1-20}$ hydrocarbon group and n is 0 or an integer of 1-10.

3. The transparent resin material according to claim 1, wherein A is H or $-CH_3$, B is H or $-CH_3$, X is H and Y is $-(CH_2)_nCOOR^1$.

4. The transparent resin material according to claim 1, wherein A is H, B is H or $-CH_3$, X is H and Y is $-COOR^1$.

5. The transparent resin material according to claim 1, wherein A is H, B is H or $-CH_3$, X is H and Y is $-COOCH_3$.

6. The transparent resin material according to claim 1, wherein the glass transition temperature of the (co)polymer is at least 100° C. and the saturated water absorption of the (co)polymer is 1.8% or less.

7. The transparent resin material according to claim 6, wherein the glass transition temperature of the (co)polymer is at least 120° C.

8. The transparent resin material according to claim 7, wherein the saturated water absorption is 1.2% or less.

9. The transparent resin material according to claim 7, wherein the saturated water absorption of the (co)polymer is 0.8% or less.

10. The transparent resin material according to claim 1, wherein at least 95% of the C═C. unsaturated bonds of the (co)polymer is hydrogenated.

11. The transparent resin material according to claim 1, wherein at least 99% of the C═C. unsaturated bonds of the (co)polymer is hydrogenated.

12. The transparent resin material according to claim 1, which has a halogen content of 50 ppm or less.

13. The transparent resin material according to claim 1, which has a halogen content of 20 ppm or less.

14. The transparent resin material according to claim 1, which has a gel content of 1% by weight or less.

15. The transparent resin material according to claim 1, which has a gel content of 0.1% by weight or less.

16. The transparent resin material according to claim 1, which has a water content of 300 ppm or less.

17. The transparent resin material according to claim 1, which has a water content of 100 ppm or less.

18. An optical article obtained from the transparent resin material of claim 1.

* * * * *